United States Patent
Ueda et al.

(10) Patent No.: US 7,839,534 B2
(45) Date of Patent: Nov. 23, 2010

(54) SCRAPBOOKING IMAGE PRINT APPARATUS, METHOD, PROGRAM, AND COMPUTER READABLE MEDIA

(75) Inventors: Michitada Ueda, Kanagawa (JP); Yumi Yamane, Kanagawa (JP); Masato Nakamura, Kanagawa (JP); Ikuko Tachikawa, Kanagawa (JP); Yasushi Hirumi, Kanagawa (JP); Atsushi Nakayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1086 days.

(21) Appl. No.: 11/538,207

(22) Filed: Oct. 3, 2006

(65) Prior Publication Data

US 2007/0153331 A1 Jul. 5, 2007

(30) Foreign Application Priority Data

Oct. 3, 2005 (JP) ............................ P2005-289731
Aug. 25, 2006 (JP) ............................ P2006-229303

(51) Int. Cl.
*G06F 15/00* (2006.01)
*G06K 1/00* (2006.01)
*G06K 15/00* (2006.01)
*G06F 3/12* (2006.01)

(52) U.S. Cl. .................................... 358/1.18; 358/1.13
(58) Field of Classification Search .................. 358/1.1, 358/1.13, 1.14, 1.15, 1.18, 1.16
See application file for complete search history.

(56) References Cited

U.S. PATENT DOCUMENTS 7,290,950 B2 * 11/2007 Donahoe et al. .............. 400/76

2003/0160824 A1 * 8/2003 Szumla ........................ 345/769

FOREIGN PATENT DOCUMENTS

| JP | 09-109506 | 4/1997 |
| JP | 11-234506 | 8/1999 |
| JP | 2002-185759 | 6/2002 |
| JP | 2002-240402 | 8/2002 |
| JP | 2003-037728 | 2/2003 |

OTHER PUBLICATIONS

Japanese Office Action dated Jul. 17, 2008 for Application No. 2006-229303.

* cited by examiner

*Primary Examiner*—Douglas Q Tran
(74) *Attorney, Agent, or Firm*—SNR Denton US LLP

(57) ABSTRACT

Disclosed herein is an image print apparatus configured to print an image for use in scrapbooking, including, an image data acquisition block configured to acquire image data of an image subject to processing, a template hold block configured to hold a plurality of templates each indicative of a clipping shape of the image for scrapbooking with a border line of the clipping shape, a template select block configured to select at least one of the plurality of templates held in the template hold block, an image display block configured to display the template selected by the select block by arranging the selected template on the image based on the image data acquired by the image data acquisition block, an operator block configured to enter a user-specified change in a relative position between the image and the template displayed on the image display block and in a size of at least one of the image and the template displayed on the image display block, and a print block configured to print the image displayed on the image display block and manipulated on the operator block.

8 Claims, 20 Drawing Sheets

Input Media   Output Menu   Select Photo   Edit Photo

Select Shape,Change Position,Size,Color,And Press "OK"

Enter Character

Birthday 040304:L:1

TP Color   TP Shape   TP Thickness

Auto

Position

Cancel   OK

H:5 cm
W:10 cm

Stop   Help ?

FIG.14

Input Media　Output Menu

Confirm Your Order

| Item | Quantity |
|---|---|
| Print L | 2 |
| Print 2L | 1 |
| Print 165×216 | 1 |
| Combined Print L | 1 |

Password : ****

| 7 | 8 | 9 |
|---|---|---|
| 4 | 5 | 6 |
| 1 | 2 | 3 |
| 0 | C |  |

Cancel　Enter

Sub Total
Tax (1.000%)
Tax 2 (1.500%)
Total　¥513　8枚

Stop　Help ?　Return　Confirm

SCRAPBOOKING IMAGE PRINT APPARATUS, METHOD, PROGRAM, AND COMPUTER READABLE MEDIA

CROSS REFERENCES TO RELATED APPLICATIONS

The present invention contains subject matter related to Japanese Patent Application Nos. JP 2005-289731 filed in the Japanese Patent Office on Oct. 3, 2005 and JP 2006-229303 filed in the Japanese Patent Office on Aug. 25, 2006, the entire contents of which being incorporated herein by reference.

BACKGROUND OF THE INVENTION

1. Field of the Invention

The present invention relates to an image print apparatus, an image print method, a program for image print method, and a recording media recording a program for image print method and, especially, applicable to the printing of images for use in scrapbooking. More particularly, the present invention is intended to be applicable to scrapbooking by superimposingly displaying a user-selected template on an image subject to processing, accepting a change in the relative positional relationship between the image and the template in this display or a change in the size of the image and/or the template, and printing a resultant image, thereby easily and surely canceling a mismatch between ruler and photograph.

2. Description of the Related Art

Recently, scrapbooking for creating scrap books has been gaining popularity. Scrapbooking is one of paper craft hobbies, in which photographs are trimmed into desired shapes, trimmed photographs are embellished in a variety of manners, and embellished photographs are attachingly laid out on mounts, thereby creating an original scrapbook.

In order to satisfy the needs of scrapbooking hobbyists, various tools and materials are supplied, such as various kinds of mounts, decorations for various kinds of embellishments, various kinds of rulers for photograph clipping, and various kinds of scissors, and so on. By use of any of these rulers, an outline can be drawn on a photograph, which is cut along the outline with a pair of scissors into a star, a heart, or rhombus, for example, to be attached on a mount.

With respect to these various processes associated with scrapbooking, Japanese Patent Laid-open No. 2004-114464 and so on disclose methods of directly printing images on album sheets by use of layouts selected by users. Also, JP-A-2003-532205 discloses a method of setting the format of each image so as to correspond to the layout of each album and then printing the formatted image. Japanese Patent Laid-open No. 2004-268353 discloses a method of selectively printing an area specified by user. Japanese Patent Laid-open No. Hei 11-321010 discloses a method of printing trim marks for trimming photographs, along with images.

In clipping a photograph by use of a ruler in scrapbooking, the subject in the photograph may be smaller or larger than the ruler. In such a case, the size of the ruler may be matched with the size of the photograph, the size of the photograph may be matched with the size of the ruler, or the both the sizes may be altered. If the mismatch between ruler and photograph can be easily and surely removed, a scrapbook may be easily created as intended in design, thereby significantly enhancing the joy of scrapbooking.

In this case, the above-mentioned method disclosed in Japanese Patent Laid-open No. 2004-114464 or JP-A-2003-532205 may be applied to print photographs. However, these methods diminish the joy of creating scrapbooks by manually clipping photographs. It is also possible to apply the method disclosed in Japanese Patent Laid-open No. 2004-268353 or Japanese Patent Laid-open No. Hei 11-321010. However, these methods are practically inapplicable to complicated and various photograph clipping operations associated with scrapbooking.

SUMMARY OF THE INVENTION

Therefore, the present invention addresses the above-identified and other problems associated with related-art methods and apparatuses and solves the addressed problems by providing an image print apparatus, an image print method, a program for the image print method, and a recording media recording the program for the image print method that are applicable to scrapbooking in easily and surely canceling the mismatch between the sizes of ruler and photograph.

In carrying out the invention and according to one embodiment thereof, there is provided an image print apparatus configured to print an image for use in scrapbooking. The above-mentioned image print apparatus has an image data acquisition block configured to acquire image data of an image subject to processing; a template hold block configured to hold a plurality of templates each indicative of a clipping shape of the image for scrapbooking with a border line of the clipping shape; a template select block configured to select at least one of the plurality of templates held in the template hold block; an image display block configured to display the template selected by the select block by arranging the selected template on the image based on the image data acquired by the image data acquisition block; an operator block configured to operate a user-specified change in a relative position between the image and the template displayed on the image display block and in a size of at least one of the image and the template displayed on the image display block; and a print block configured to print the image displayed on the image display block and manipulated on the operator block.

In carrying out the invention and according to another embodiment thereof, there is provided an image print method for printing an image for use in scrapbooking. The above-mentioned method has the steps of: acquiring image data of an image subject to processing; selecting at least one of the plurality of templates held in the template hold block, wherein the holding a plurality of templates each indicative of a clipping shape of the image for scrapbooking with a border line of the clipping shape; displaying the template selected by the select block by arranging the selected template on the image based on the image data acquired by the image data acquisition step; operating a user-specified change in a relative position between the image and the template displayed in the image display step and in a size of the image and the template displayed in the image display step; and printing the image displayed in the image display step and manipulated in the user-specified change operating step.

In carrying out the invention and according to still another embodiment thereof, there is provided a computer-readable program configured to execute an image print method for printing an image for use in scrapbooking by a computational procedure. The above-mentioned computer-readable program has the steps of: acquiring image data of an image subject to processing; selecting at least one of the plurality of templates held in the template hold block, wherein the holding a plurality of templates each indicative of a clipping shape of the image for scrapbooking with a border line of the clipping shape; displaying the template selected by the select block by arranging the selected template on the image based on the image data acquired by the image data acquisition step;

operating a user-specified change in a relative position between the image and the template displayed in the image display step and in a size of the image and the template displayed in the image display step; and printing the image displayed in the image display step and manipulated in the user-specified change operating step.

In carrying out the invention and according to yet another embodiment thereof, there is provided a recording media storing a computer-readable program configured to execute an image print method configured to print an image for use in scrapbooking by a computational procedure. The computer-readable program stored in the above-mentioned recording media has the steps of: acquiring image data of an image subject to processing; selecting at least one of the plurality of templates held in the template hold block; holding a plurality of templates each indicative of a clipping shape of the image for scrapbooking with a border line of the clipping shape; displaying the template selected by the select block by arranging the selected template on the image based on the image data acquired by the image data acquisition step; operating a user-specified change in a relative position between the image and the template displayed in the image display step and in a size of the image and the template displayed in the image display step; and printing the image displayed in the image display step and manipulated in the user-specified change operating step.

According to the first embodiment of the invention, in which the image print apparatus has an image data acquisition block for acquiring image data of an image subject to processing; a template hold block for holding a plurality of templates each indicative of a clipping shape of the image for scrapbooking with a border line of the clipping shape; a template select block for selecting at least one of the plurality of templates held in the template hold block; an image display block for displaying the template selected by the select block by arranging the selected template on the image based on the image data acquired by the image data acquisition block; an operator block for operating a user-specified change in a relative position between the image and the template displayed on the image display block and in a size of the image and the template displayed on the image display block; and a print block for printing the image displayed on the image display block and manipulated on the operator block, the user can change the size of the image and the size of the template in various ways while checking the relationship between the template and the image displayed on the image display block, thereby easily and surely eliminating the mismatch between the size of a ruler and the size of a photograph for scrapbooking.

According to the second through the fourth embodiments, an image print method for easily and surely eliminating the mismatch between the size of a ruler and the size of a photograph, a program for this image print method, and a recording media storing this program are provided.

As described above, the present invention is applicable to scrapbooking to easily and surely eliminate the mismatch between the size of a ruler and the size of a photograph.

BRIEF DESCRIPTION OF THE DRAWINGS

Other objects and embodiments of the invention will become apparent from the following description of embodiments with reference to the accompanying drawings in which:

FIG. 8 is a top view of a display screen that is displayed when "Edit/Zoom-in" menu is selected on the image selection screen shown in FIG. 6;

FIG. 9 is a top view for describing template switching on the display screen shown in FIG. 8;

FIG. 12 is a top view for describing template size change on the display screen shown in FIG. 8;

FIG. 14 is a top view of a display screen associated with accounting processing;

DETAILED DESCRIPTION OF THE PREFERRED EMBODIMENTS

This invention will be described in further detail by way of embodiments thereof with reference to the accompanying drawings.

(1) Configuration of a First Embodiment

Figure 2:
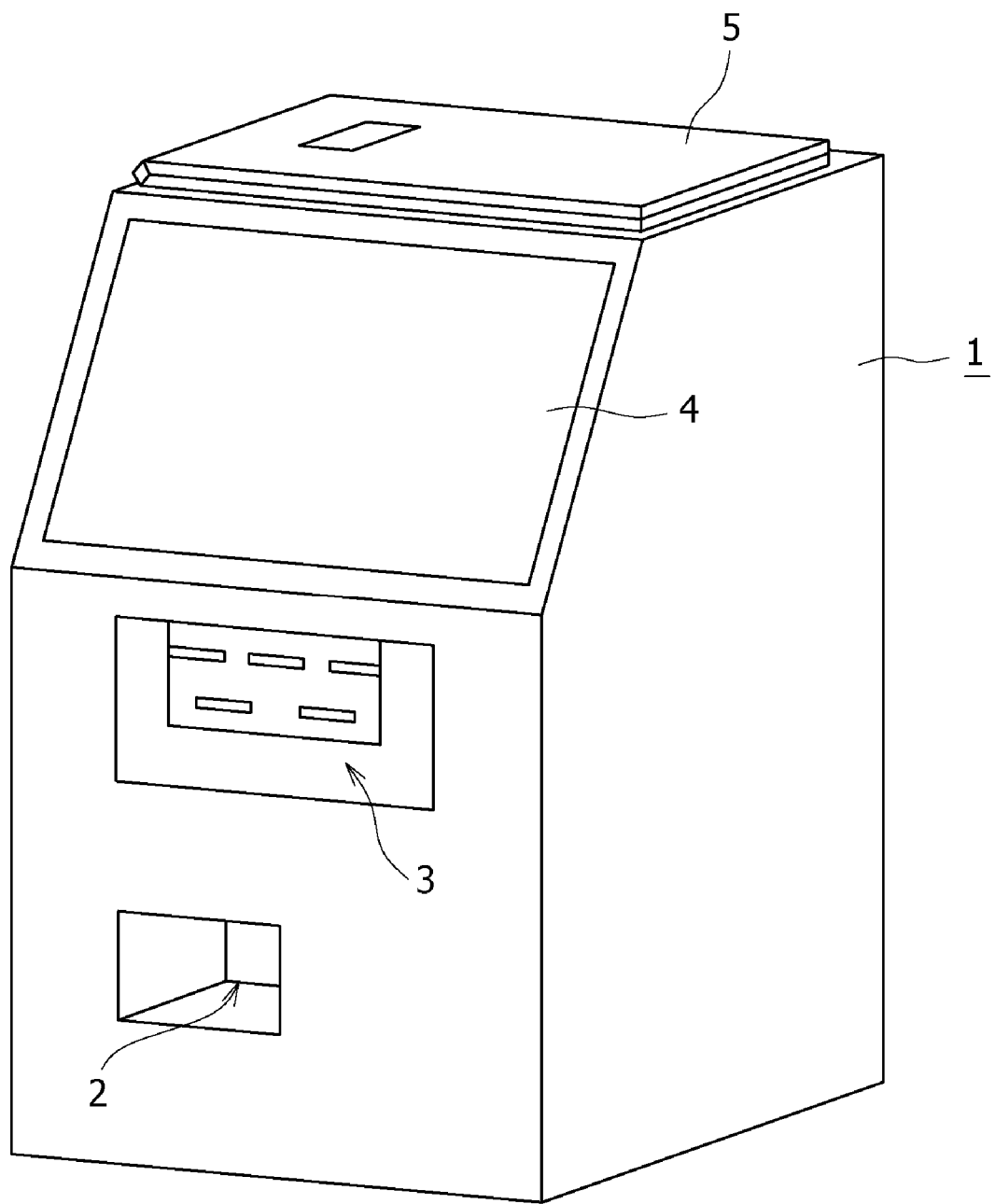
FIG. 2 is a perspective view of the above-mentioned image print apparatus.

Referring to FIG. 2, there is shown a perspective view of an image print apparatus practiced as a first embodiment of the invention. An image print apparatus 1, installed in each store front, prints images based on image data recorded to recording media, such as memory cards for example.

The image print apparatus 1 has a generally tall rectangular form and is arranged with a photograph delivery port 2 on the front side through which photographs, a result of printing, are delivered to customers. Above the photograph delivery port 2, a recording media slot is arranged through which various recording media, such as a memory card, a magnetic disk, and an optical disk, for example, are loaded. A card slot through which a credit card, for example, for accounting or fee charging is inserted is also arranged above the photograph delivery port 2. Above the recording media slot 3, an image display block 4 based on a touch panel is arranged. The selective operation made by each user, through the touch panel, on a menu screen shown on the image display block 4 is detected and accepted by the image print apparatus 1. On top of the image print apparatus 1, a flat-bed scanner 5 for use in template registration is arranged.

Figure 3:
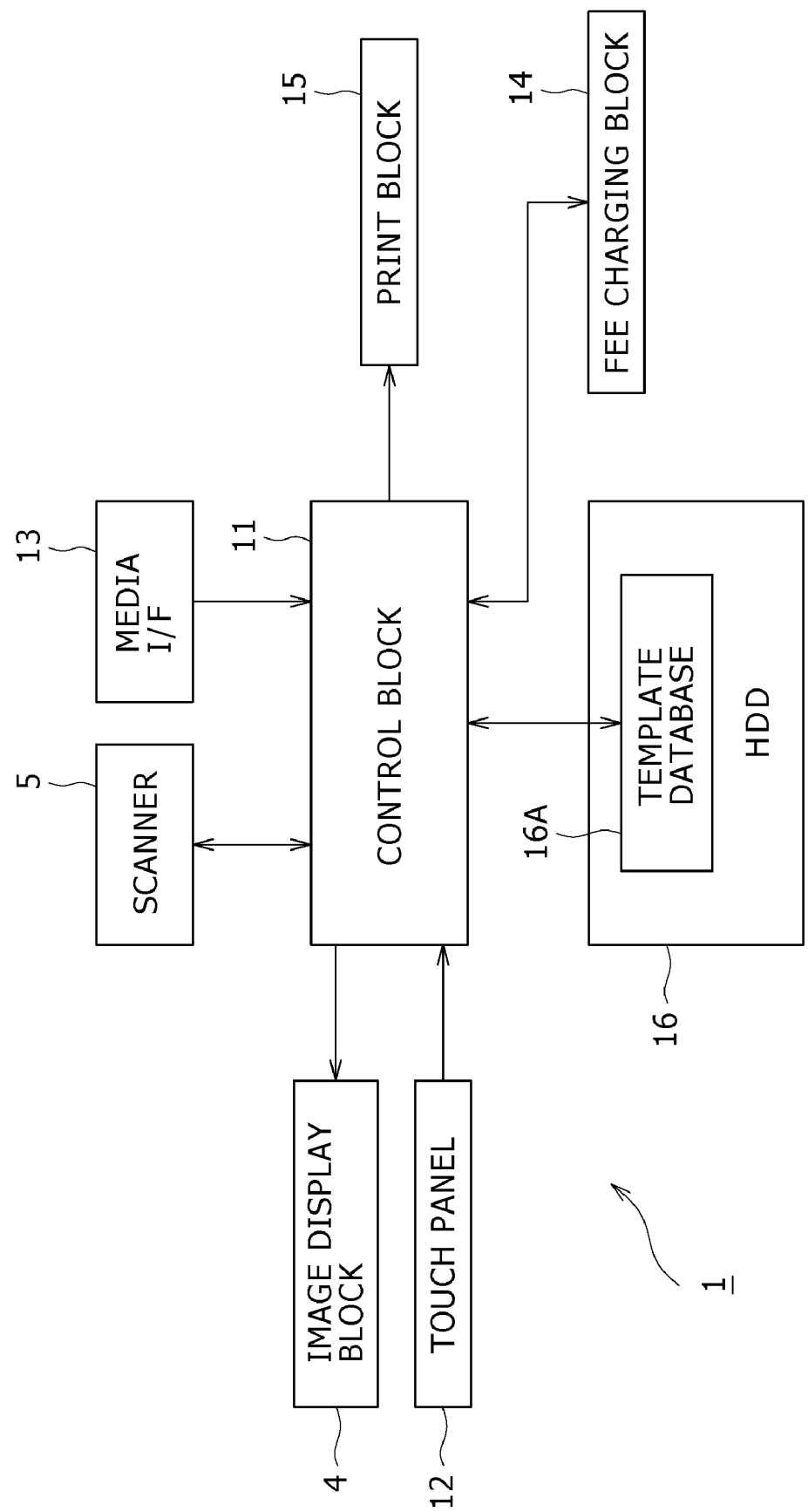
FIG. 3 is a block diagram illustrating the image print apparatus shown in FIG. 2.

Referring to FIG. 3, there is shown an exemplary configuration of the image print apparatus 1. In the image print apparatus 1, the image display block 4 displays, under the control of a control block 11, various images necessary for the processing by the image print apparatus 1. A touch panel 12 detects various operations done by the user and transmits the detection to the control block 11. The flat-bed scanner 5 captures an image printed on a sheet of paper set on the flat-bed scanner 5 and transmits the captured image to the control block 11. A media interface (I/F) 13 captures image data for example from a recording media loaded in the recording media slot 3 and transmits the captured image data to the control block 11. A fee-charging block 14 execute a sequence of processes associated with accounting. A print block 15 prints images on predetermined sheets of paper under the control of the control block 11 and sends the prints to the photograph delivery port 2.

A hard disk drive (HDD) 16 stores programs and various data associated with the processing to be executed in the image print apparatus 1. In the image print apparatus 1, a template database 16A is configured by the recording of data by the HDD 16. The template database 16A stores templates that indicate the border lines of clippings of images associated with scrapbooking. These templates are registered into the template database 16A in advance or added later thereto by use of the flat-bed scanner 5. It should be noted that various shapes of templates are prepared beforehand in the first embodiment, such as square, rectangle, circle, ellipsis, polygon, and heart, for example. On the other hand, although preinstalled in the image print apparatus 1, processing programs recorded to the HDD 16 may alternatively be provided in various recording media, such as optical disk, memory card, and magnetic disk, for example. Still alternatively, the processing programs may be downloaded from networks, such as the Internet, into the image print apparatus 1.

The control block 11, configured by a computation processing for controlling the operation of the entire image print apparatus 1, controls the operation of each of the component blocks of the image print apparatus 1 by executing processing programs stored in the HDD 16. When this processing procedure is executed and upon the detection of a user operation on the touch panel 12 a power-on sequence or in a standby status, the control block 11 displays an initial menu screen on the image display block 4. When a predetermined operation is executed on the initial menu screen, the control block 11 switches the operation mode to the maintenance mode, controls the operation of the flat-bed scanner 5 to get a template image, and registers the template image into the template database 16A.

Figure 4:
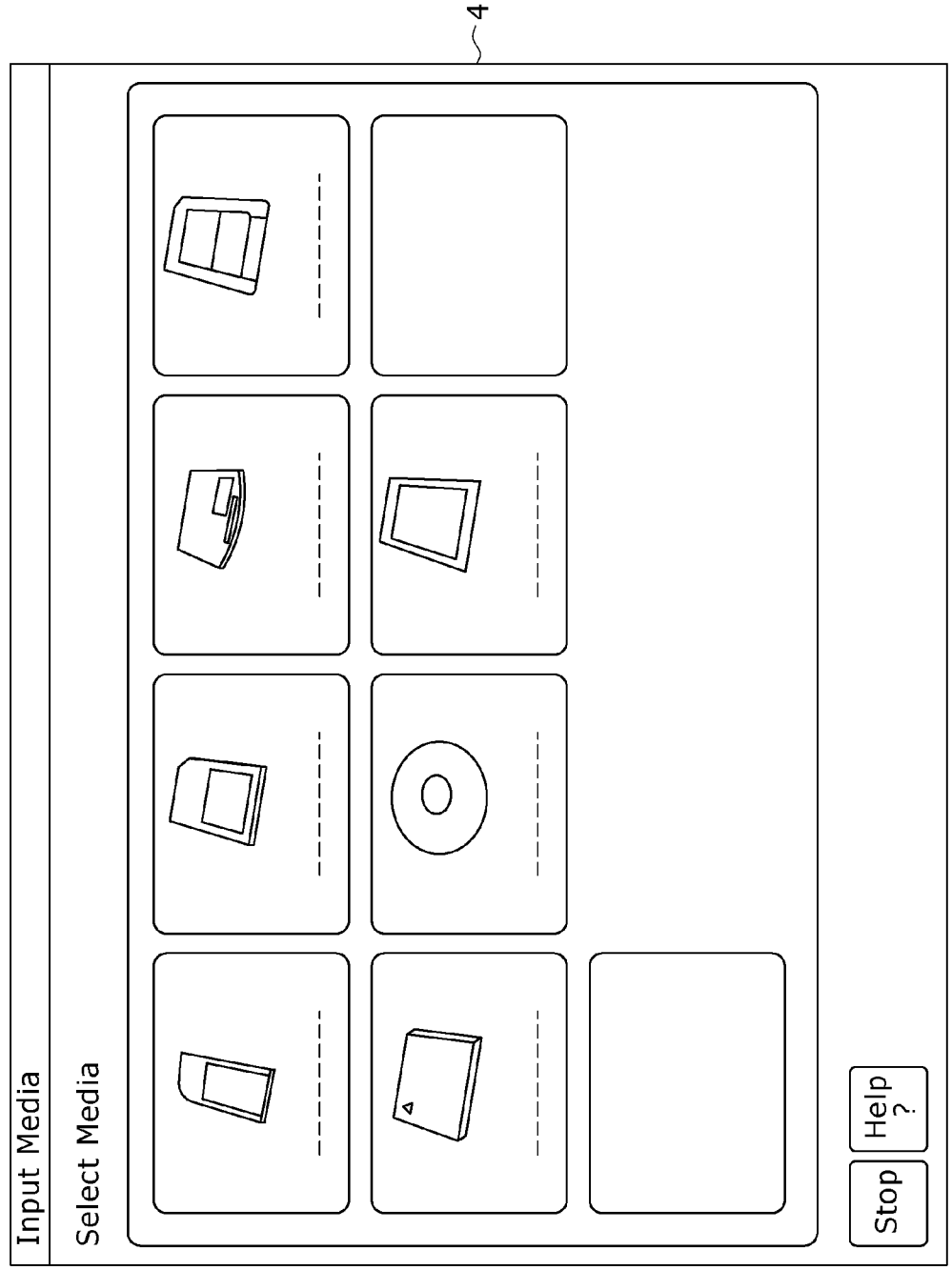
FIG. 4 is a top view of a recording media selection screen in the image print apparatus shown in FIG. 2.

If a photograph print menu is selected on the initial menu screen, the control block 11 displays a recording media select screen shown in FIG. 4 onto the image display block 4. In this recording media select screen, the title of this select screen is shown on top and a user operation prompt message is shown below. Below this message, a menu indicative of recording media loadable in the recording media slot 3 is shown. At the bottom, "Stop" menu for telling the user to stop the operation and "Help" menu for displaying a help screen are shown.

Figure 5:
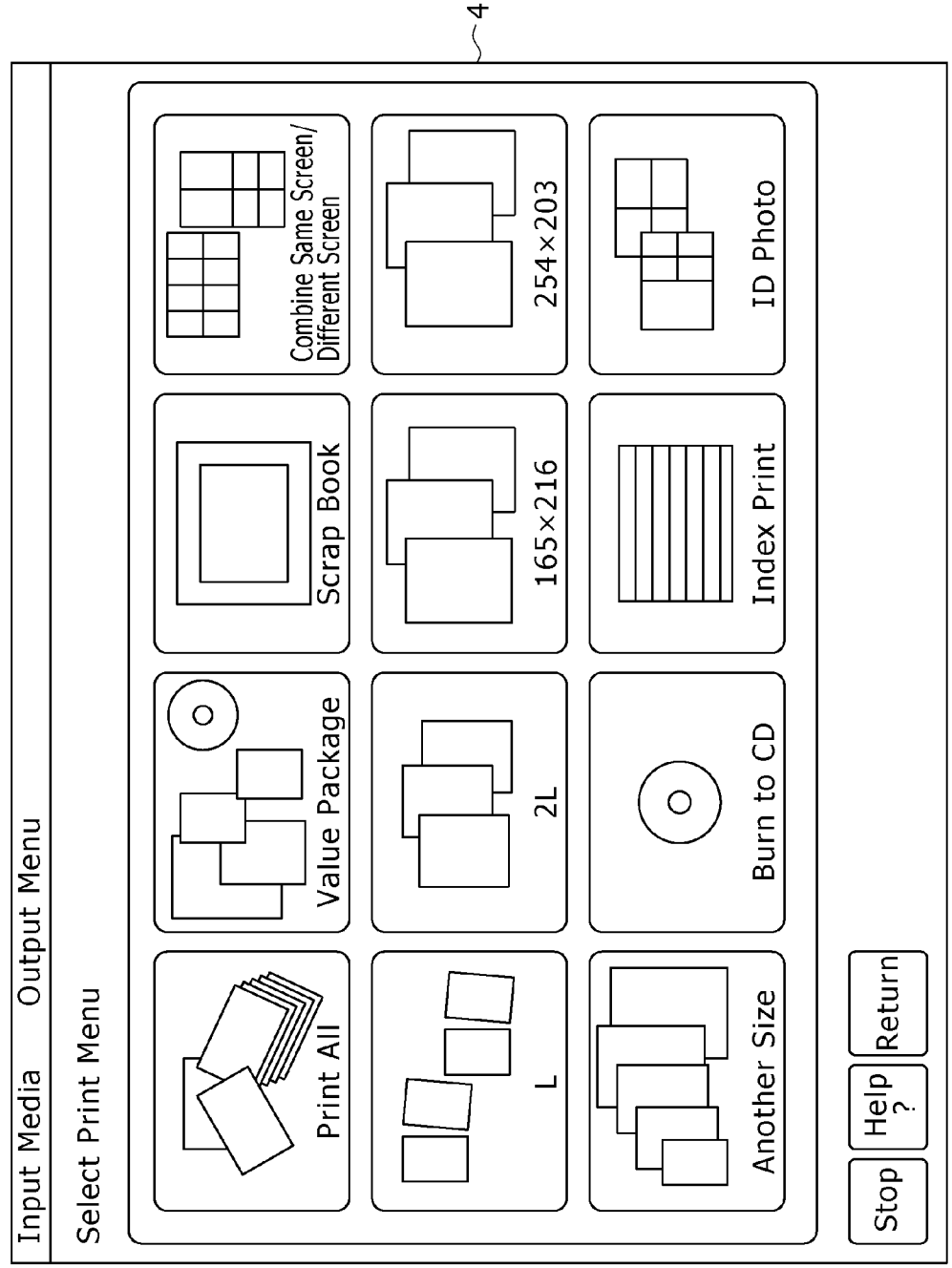
FIG. 5 is a top view of a processing selection screen in the image print apparatus shown in FIG. 2.

If, on this select screen, a selective operation by the user through the touch panel 12 is detected and "Stop" menu is selected by the user, the control block 11 switches the display to the original initial menu screen. If "Help" menu is selected by the user, the control block 11 displays the help screen. On the other hand, if one of the recording media menus, the control block 11 displays a sequence of operation instruction screens on the image display block 4 to instruct the user to load the user-selected recording media into the recording media slot 3. When the user-selected recording media is inserted, the control block 11 obtains image data from the inserted recording media to store the image data in the HDD 16 and then switches the display to a processing select screen shown in FIG. 5.

In this processing select screen, the title of this screen is shown on top followed by title "Output Menu", below which a message prompting the user to execute an operation is shown. Below this message, menus of selectable processes are shown. When "Print All" menu is selected, all images stored in the loaded recording media are printed in regular size. When "Value Package" menu is selected, the image data stored in the recording media is recorded to an optical disk, in addition to the execution of the processing associated with "Print All" menu. When "Scrapbook" menu is selected, processing associated with scrapbooking is executed. When "Combine Same Screen/Different Screen" menu is selected, printing by so-called print seals is executed. When "L", "2L", "155×206" or "203×254" menu is selected, printing is executed with the selected print paper size. When "Another Size" menu is selected, printing with another print size is executed. When "Burn to CD" menu is selected, the image data stored in the recording media is recorded to an optical disk. When "Index Print" menu is selected, gang run printing is executed. When "ID Photo" menu is selected, the printing of identification photograph is executed. Arranged at the bottom of this screen are "Stop" for stopping the operation, "Help" for displaying the help screen, and "Return" for getting back to the previous select screen.

When any of the above-mentioned menus is selected by the user, the control block 11 switches between the display screens on the image display block 4 to accept the input done by the user, thereby executing a sequence of processing operations associated with the selected operation. In this processing, if the user selects "Scrapbook" menu for example, the control block 11 displays "Layout" menu and "Creative Border" menu in substantially the same layout.

"Layout" menu is used to create prints with photographs attached on a mount in a scrapbook. When this menu is selected, the control block 11 sequentially switches between display screens on the image display block 4, thereby accepting the inputs done by the user with respect to the layout of each image based on image data recorded to the recording media, clip shapes, and embellishment characters. On the basis of the accepted layout, the control block 11 processes the images based on image data recorded to the recording media, prints the processed images through the print block 15, and outputs a scrapbook as a printed material with photographs clipped into user-desired shapes attached on mounts along with various embellishments.

"Creative Border" menu is used to print photographs for scrapbooking. When this menu is selected, the control block 11 switches between the display screens on the image display block 4 to display "Cut Line" and "Add Border" menus in substantially the same layout.

"Add Border" menu is used to print a photograph with a user-desired border. When this menu is selected, the control block 11 sequentially switches between the display screens on the image display block 4, adds a user-selected border to each image based on the image data recorded to the recording media and prints the bordered image.

"Cut Line" menu is used to make the printing in which it is presupposed to cut each photograph into a desired shape to be attached onto a mount. When this menu is selected, the control block 11 switches the display screen on the image display block 4 to the image select screen shown in FIG. 6.

Figure 6:
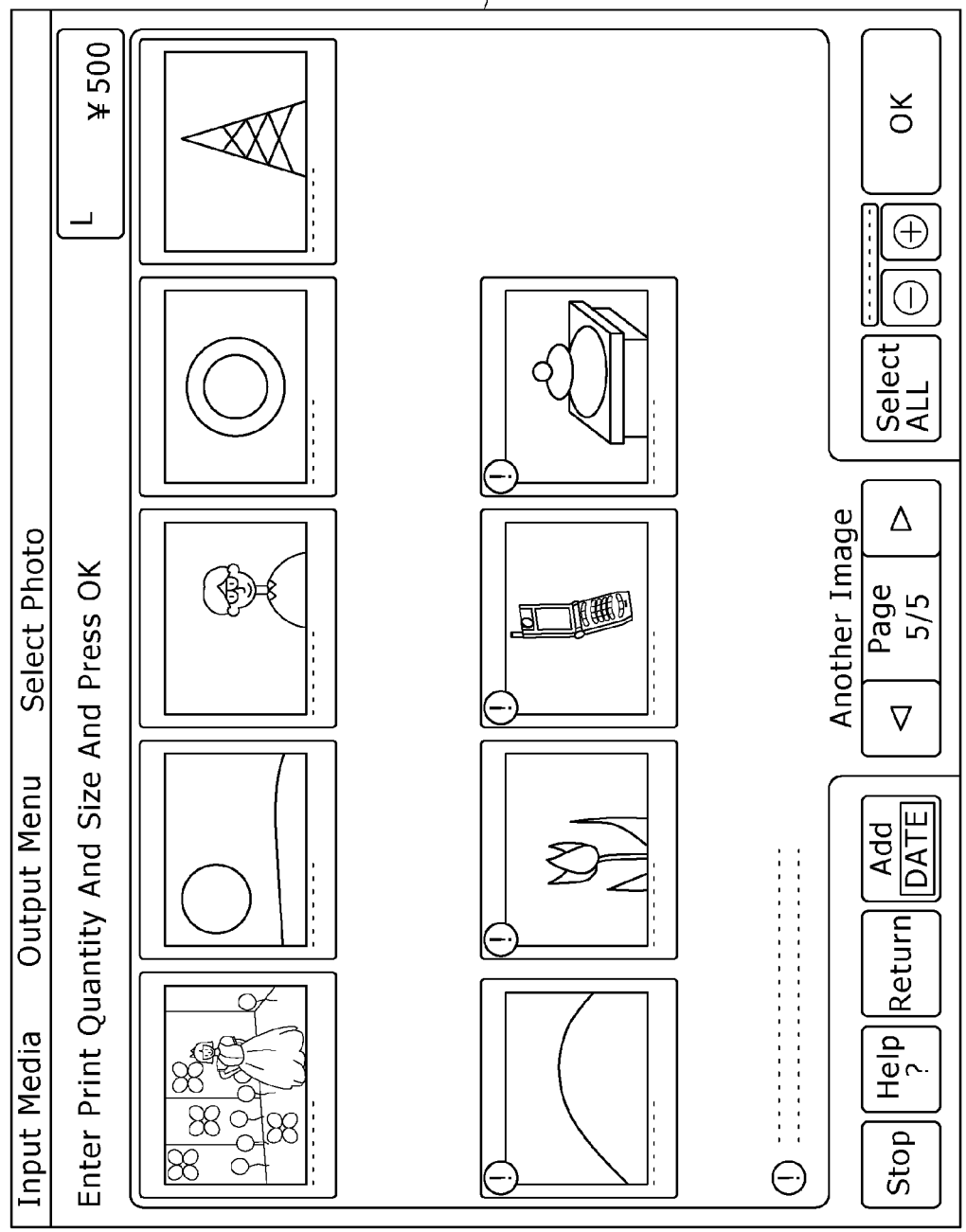
FIG. 6 is a top view of an image selection screen in the image print apparatus shown in FIG. 2.

In the image select screen shown in FIG. 6, "Input Media", "Output Menu", and "Select Photo" are shown on top, below which a message ("Enter Print Quantity And Size And Press OK."), for example, prompting the user to execute necessary operations is shown, along with the initially set print size (L) and a price of each print (¥500). Also, menus for selecting images recorded to the recording media are displayed in list form in thumbnail images. Below these thumbnail images, a page switching menu is shown. At the left side of the bottom of this screen, "Stop" menu for stopping the operation, "Help" menu for displaying the help screen, "Return" menu for returning to the previous select screen, and "Add Date" menu for adding date to prints are shown. At the right side of the bottom of this screen, "Select All" menu for printing all images, a selection change menu for changing the selection made by "Select All" menu, and "OK" menu for starting the print operation.

Figure 7:
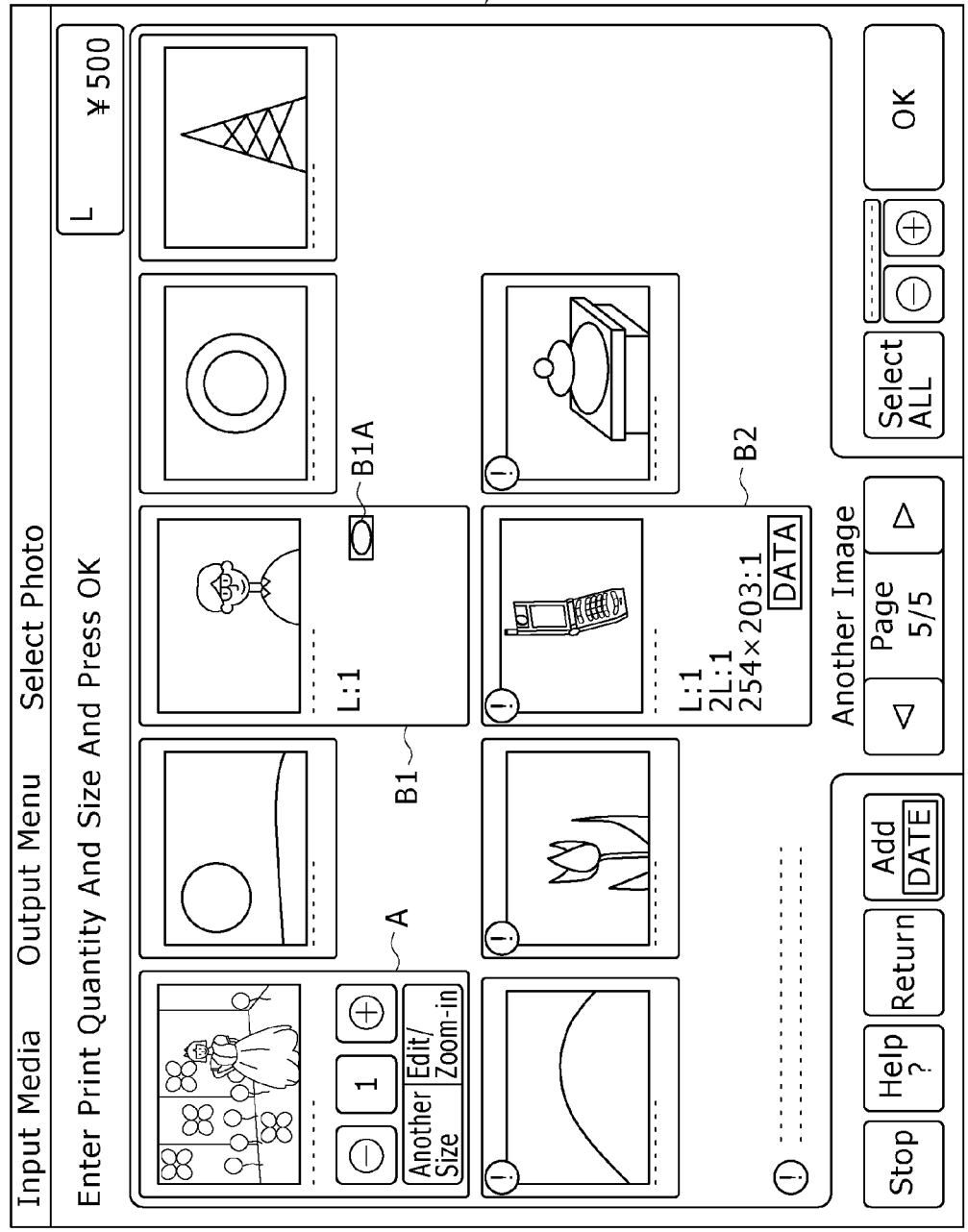
FIG. 7 is a top view for describing the image selection screen shown in FIG. 6.

When a menu select operation is executed by the user, the control block 11 accepts the setting corresponding to this operation. In this processing, when one of the thumbnail image menu is selected by the user, the control block 11 displays the selected menu with an extended border thereof as indicated by "A" as shown in FIG. 7, for example. In this enlarged menu, symbols "+" and "−" for incrementing and decrementing the number of prints are shown along with the currently set print count (in the example shown in FIG. 7, one represented by numeral "1"). When "+" or "−" menu is operated and the print count increase/decrease menu associated with "Select All" menu is operated, the control block 11 accepts the change of the print count of images represented by selected thumbnail images.

Further, "Another Size" menu is shown in the extended border, which is operated to switch from the initially set size "L" to another size. When "Another Size" menu is operated, the control block 11 displays a print size sub menu. When another size is selected from this print size sub menu, the control block 11 accepts the selected size and the number of prints associated with the selected size.

In addition, "Edit/Zoom-in" menu is shown for displaying the thumbnail image in zoom-in manner and editing the thumbnail image when this menu is selected, the control block 11 starts the edit processing to be described later. When the edit processing has been completed or if other thumbnail images are selected, the control block 11 displays set items with the borders of the newly selected thumbnail images extended as indicated by B1 and B2. In the case of the image associated with the thumbnail image indicated by B1, one sheet of print is specified with print size L. In addition, in this thumbnail image, edit processing is executed by operating a marker indicated by B1A to specify the printing of cutoff lines. In the case of the image associated with the thumbnail image indicated by B2, one sheet of print with each of print sizes L, 2L, and 165×205 is specified with the date added by the operation of "Add Date" menu.

Figure 8:
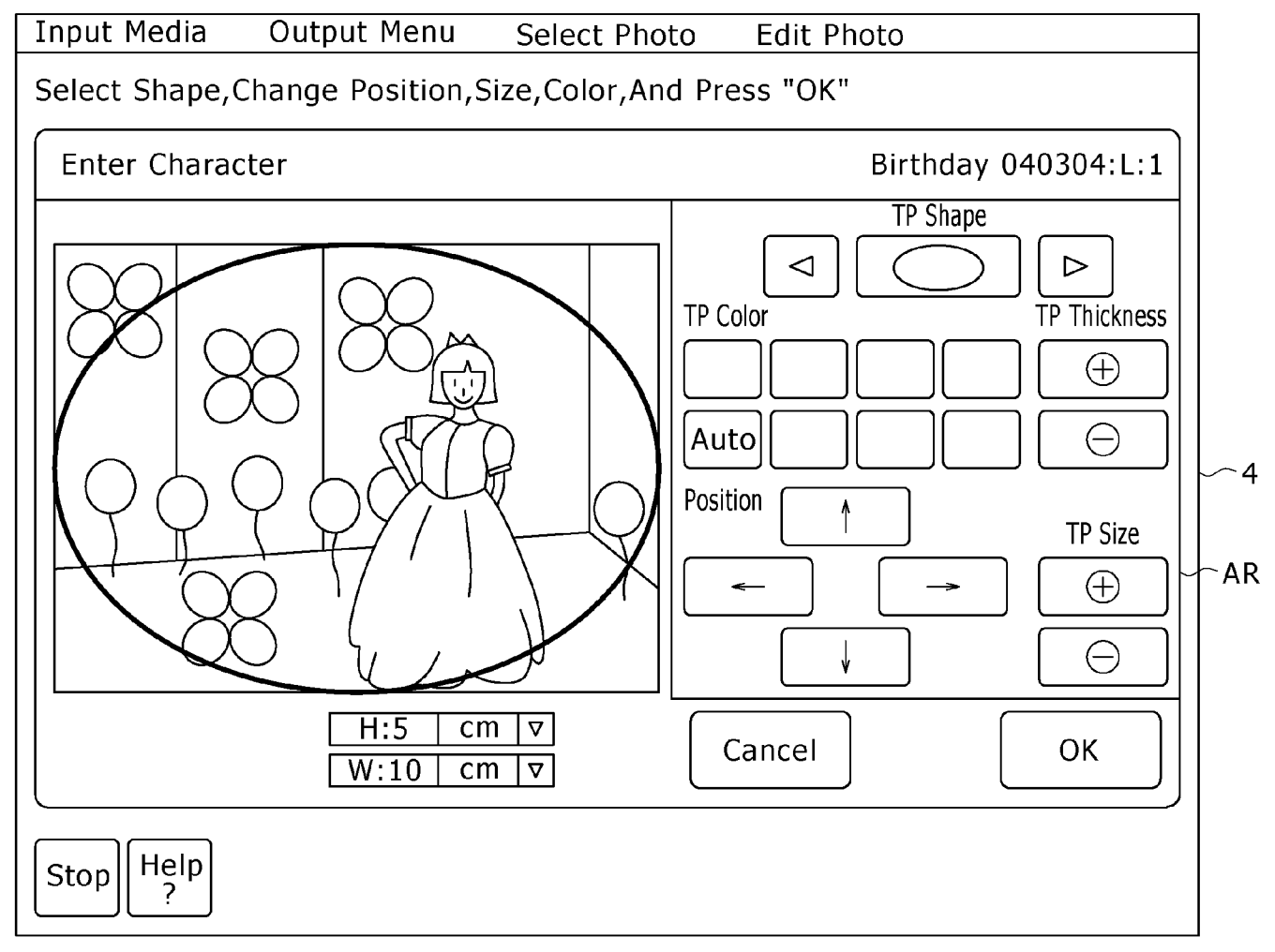

Referring to FIG. 8, there is shown a top view of a screen shown on the image display block 4 when "Edit/Zoom-in" menu is selected. When this menu is selected, the control block 11 switches the screen currently shown on the image display block 4 to a zoom-in screen shown in FIG. 8. In this zoom-in screen, "Edit Photo" title is shown on top after the screen titles described above, below which a message prompting the user to execute necessary operations is shown. Below this message, preview screen area AR is shown. At the bottom, "Stop" menu for stopping the operation and "Help" menu for displaying the help screen are shown.

In the preview screen area AR, a file name (Birthday040304) of the corresponding image data recorded to the recording media is shown along with print size (L) and print count (1). At the bottom, the height (H) and width (W) of the template superimposed on the preview screen at the time of printing are shown along with the unit switching menu. In addition, "Cancel" menu for canceling a sequence of operations done on this zoom-in display screen and "OK" menu for completing the processing are shown.

In the preview screen area AR, the preview image corresponding to the thumbnail image selected by the user is shown in the left half. With this preview image, one of a plurality of templates recording to the template database 16A is superimposingly displayed in default size, color, and line thickness. Consequently, in the example of FIG. 8, a template of horizontally long oval is shown. In what follows, each template is appropriately represented by TP.

Figure 9:
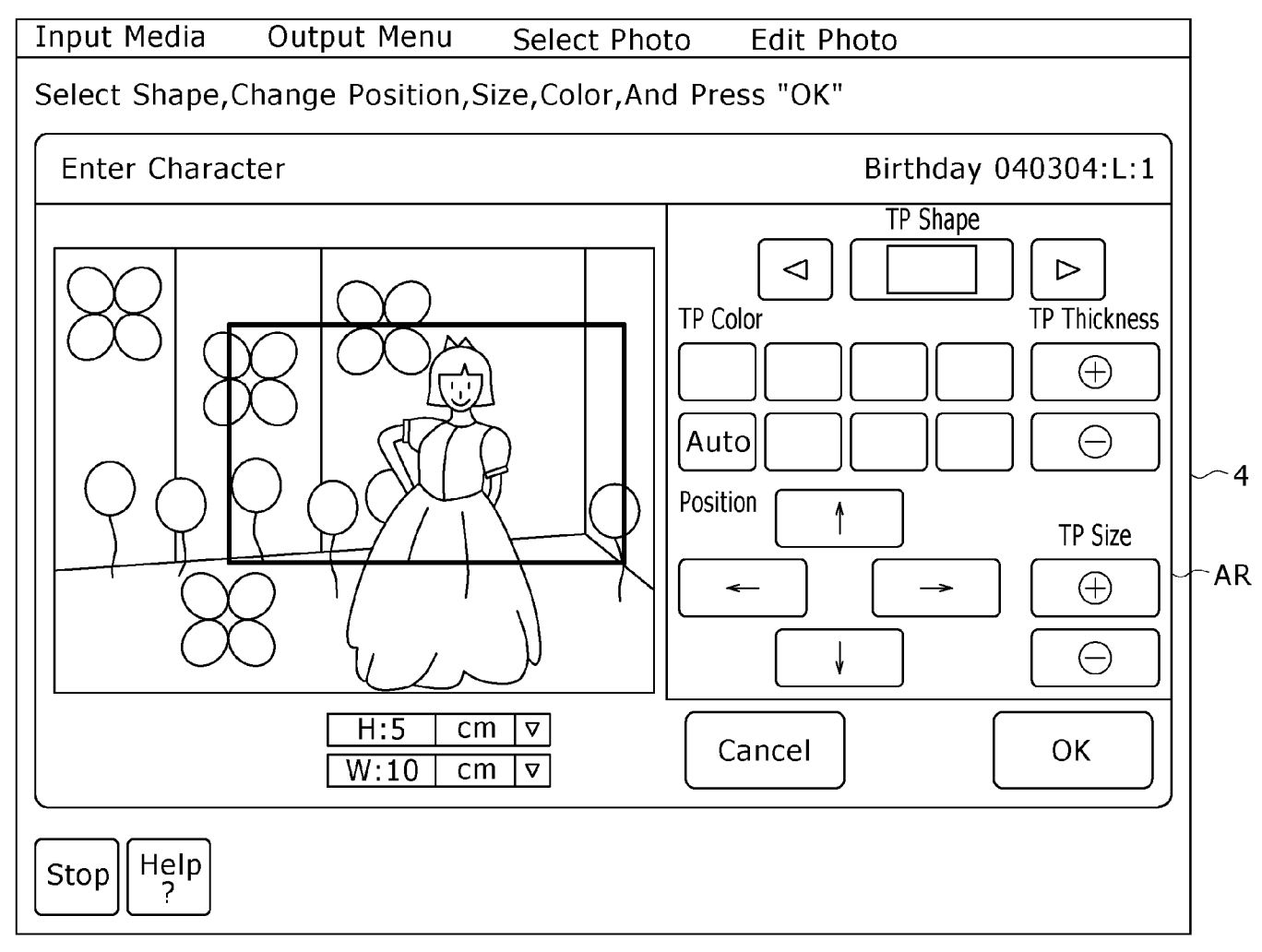

In the preview screen area AR, various menus for operating the template shown on the preview screen are shown in the right half. Template operating menus are shown on top, the shape and color of the currently displayed template are shown in the center. Template change menus are shown at the right and left sides. It should be noted that, in the center display, the color of the template is the color of a portion enclosed by the shape of the template. The control block 11 sequentially selects templates recorded to the template database 16A in response to the menu selection by the user for template changing, thereby switching the current template to the newly selected template in the preview screen as shown in FIG. 9 with reference to FIG. 8.

Figure 10:
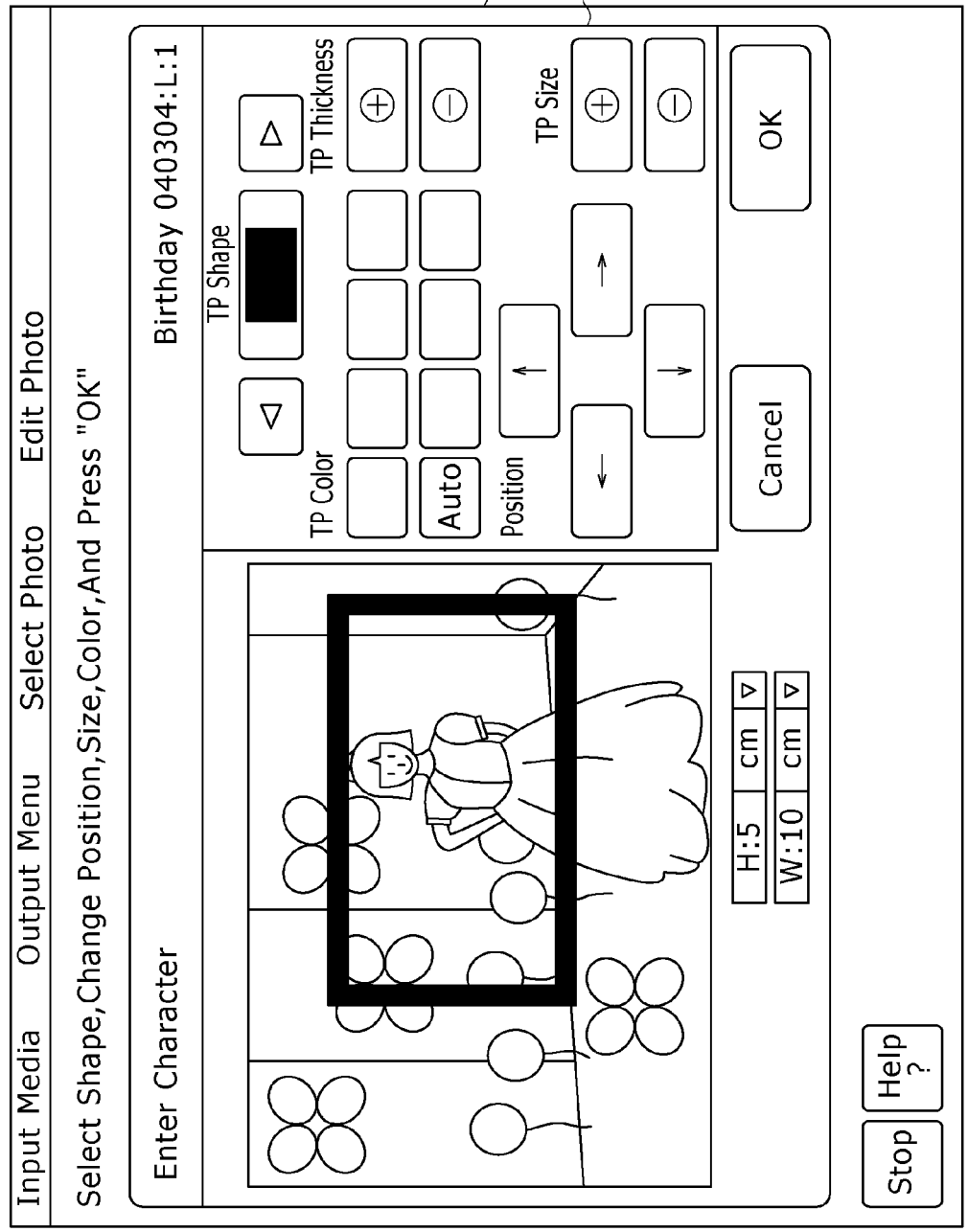
FIG. 10 is a top view for describing template line thickness change on the display screen shown in FIG. 8.

To the right side of the template operating menus, a menu for increasing or decreasing the thickness of lines of the template shown in the preview image is shown. The control block 11 varies the line thickness of the template superimposed on the preview image in response to the selection by the user of the template line thickness varying menu as shown in FIG. 10 with reference to FIG. 9.

Figure 11:
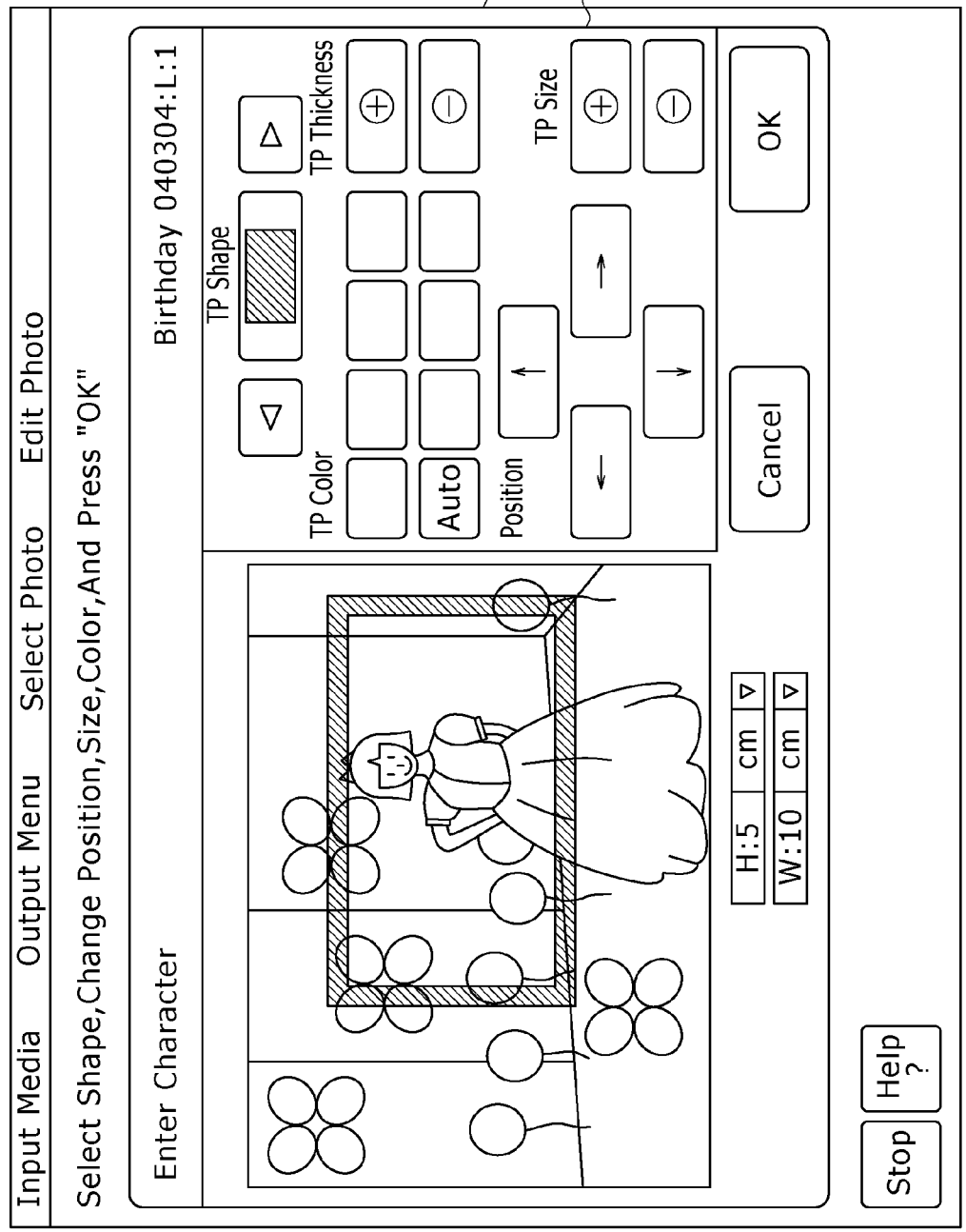
FIG. 11 is a top view for describing template color change on the display screen shown in FIG. 8.

Each template operating menu is shown to the left side of the template line thickness varying menu, as a template color specifying menu in the form of a button with a specification-associated color set. It should be noted that "Auto" menu is used to set a color to a template to be automatically set to a color inconspicuous on each preview-associated screen. If this menu is selected, the control block 11 emphasizes or deemphasizes the pixel value of each portion of the preview image overlapping the template, thereby setting the color of the template to an inconspicuous color. In the present embodiment, each pixel value of the preview image overlapping the template is specifically detected in each portion by the RGB values and the detected RGB values are increased by a certain value to emphasize the pixel image, thus setting the color of the template. When these menus are operated by the user, the control block 11 changes the colors of the template displayed as superimposed on the preview image as shown in FIG. 11 with reference to FIG. 10.

The template operating menus are shown to the further right side, as menus for varying template sizes. When one of these menus is selected by the user, the control block 11 varies the size of the template displayed as superimposed on the preview image as shown in FIG. 12 with reference to FIG. 9.

Figure 13:
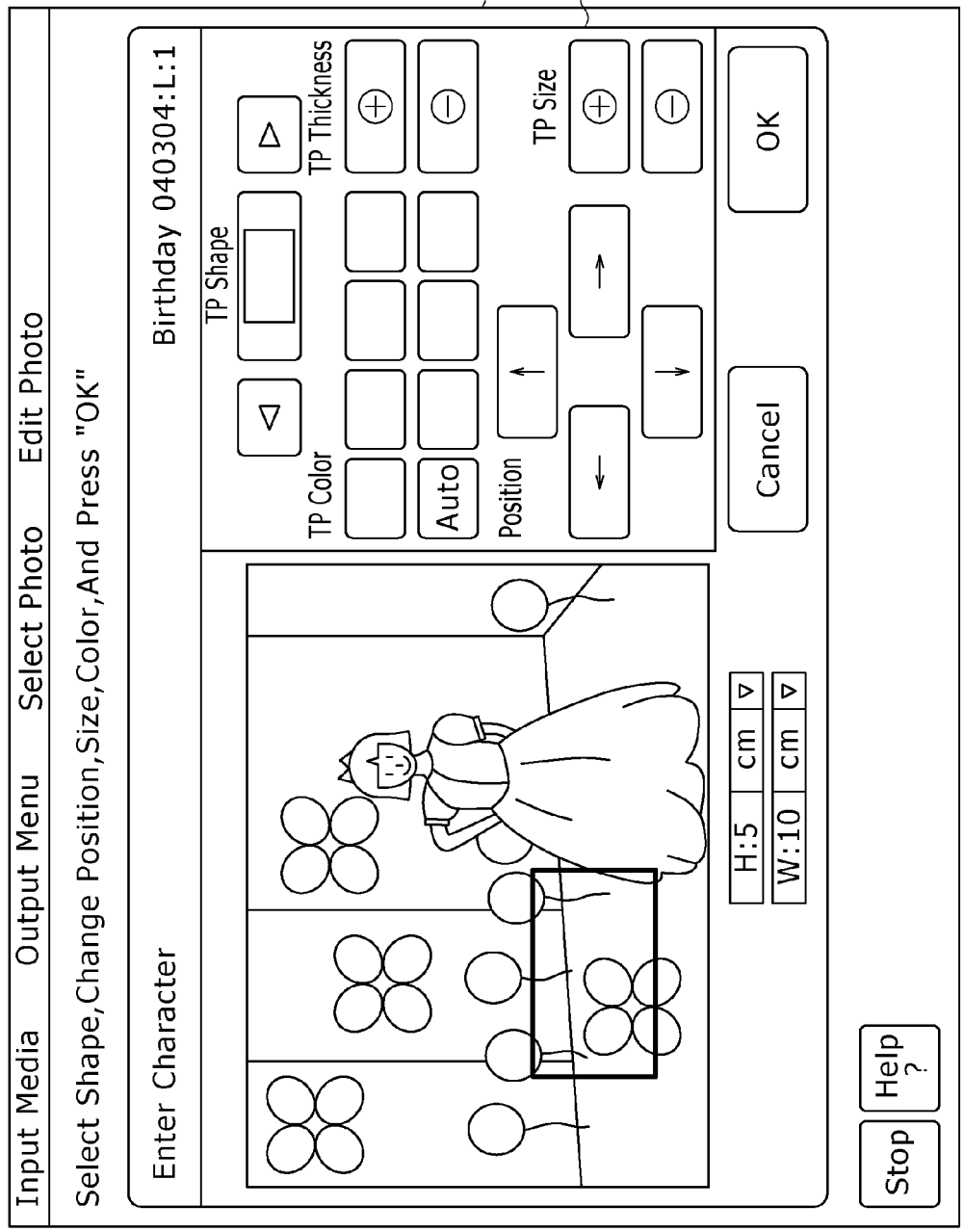
FIG. 13 is a top view for describing template move change on the display screen shown in FIG. 8.

The template operating menus are shown to the left side of the template size varying menus as menus to change a template position vertically or horizontally. When any of these menus is selected by the user, the control block 11 changes the position of the template displayed as superimposed on the preview screen as shown in FIG. 13 with reference to FIG. 12.

Figure 1:
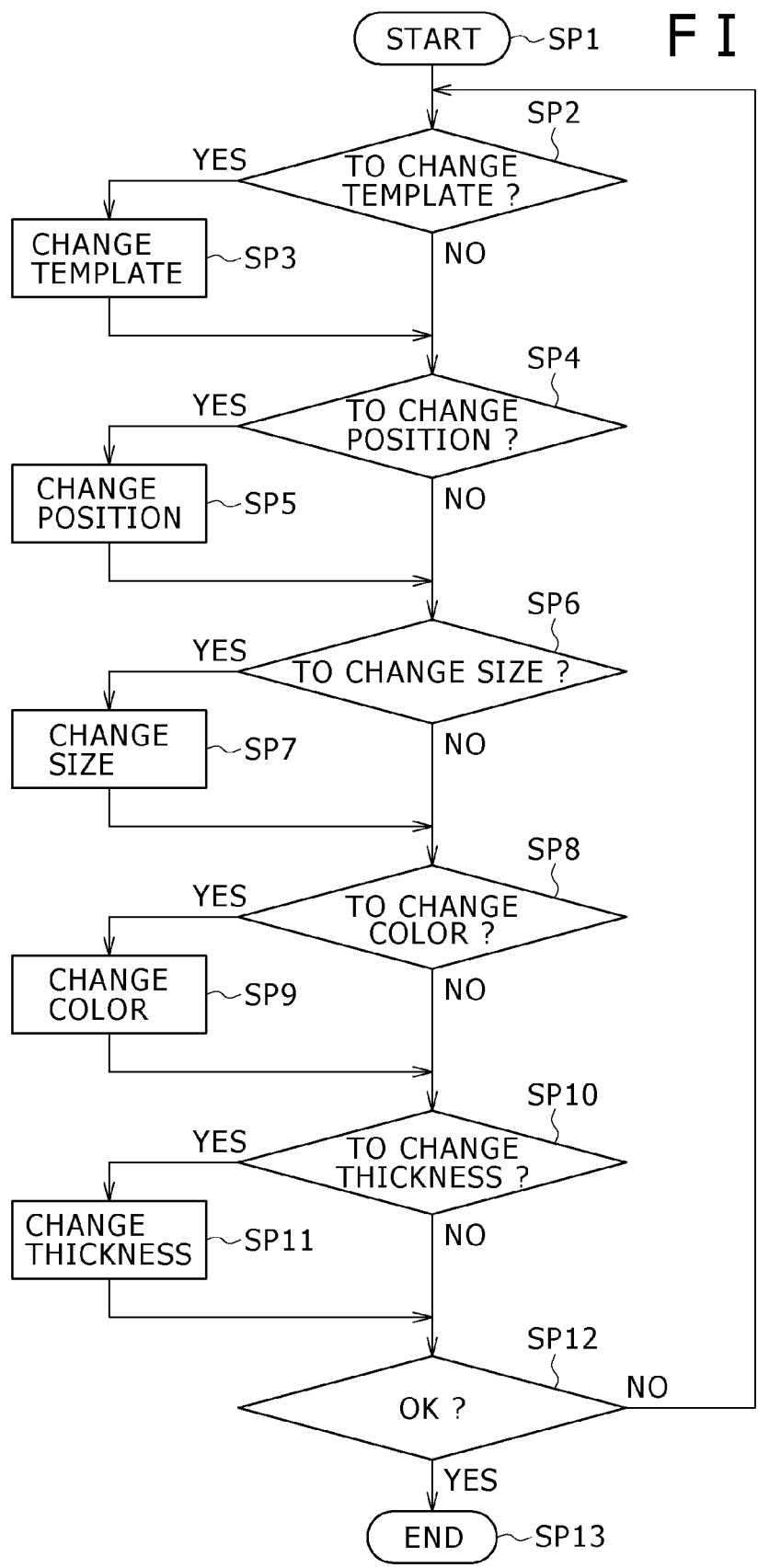
FIG. 1 is a flowchart indicative of a processing procedure of a control block of an image print apparatus practiced as a first embodiment.

Consequently, the control block 11 executes the processing procedure shown in FIG. 1 with the screen associate with the editing of this photograph displayed. Namely, when the screen associated with the editing of this photograph is displayed, the control block 11 goes from step SP1 to step SP2 to determine whether a template change has been specified or not. If the decision is Yes, the control block 11 goes from step SP2 to step SP3 to change the template displayed as superimposed on the preview screen in response to the specification by the user, upon which the control block 11 goes to step SP4. On the other hand, if the decision is No in step SP2, then the control block 11 goes from step SP2 to step SP4.

In step SP4, the control block 11 determines whether the change of template position has been specified by the user. If the decision is Yes, the control block 11 goes from step SP4 to step SP5 to change, as specified by the user, the position of the template displayed as superimposed on the preview image and then goes to step SP6. On the other hand, if the decision is No, the control block 11 goes from step SP4 to step SP6.

In step SP6, the control block 11 determines whether the change of template size has been specified by the user. If the decision is Yes, then the control block 11 goes from step SP6 to step SP7 to change, as specified by the user, the size of the template displayed as superimposed on the preview image and then goes to step SP8. On the other hand, if the decision of step SP6 is No, then the control block 11 goes from step SP6 to step SP8.

In step SP8, the control block 11 determines whether the change of template color has been specified by the user. If the decision is Yes, then the control block 11 goes from step SP8 to step SP9 to change, as specified by the user, the color of the template displayed as superimposed on the preview screen and then goes to step SP10. On the other hand, if the decision in step SP8 is No, then the control block 11 goes from step SP8 to step SP10.

In step SP10, the control block 11 determines whether the change of template line thickness has been specified by the user. If the decision is Yes, the control block 11 goes from step SP10 to step SP11 to change, as specified by the user, the line thickness of the template displayed as superimposed on the preview screen and then goes to step SP12. On the other hand, if the decision in step SP10 is No, then the control block 11 goes from step SP10 to step SP12.

In step SP12, the control block 11 determines whether the ending of the processing has been specified by the user. If the decision is No, the control block 11 returns from step SP12 to step SP2 to wait for the user to make another operation. On the other hand, if the decision in step SP12 is Yes, then the control block 11 goes from step SP12 to step SP13 to end the above-mentioned processing.

The control block 11 displays a preview screen for each of the menu screens corresponding to thumbnail images selected by the user as described above and accepts the settings supplied by the user. When the user selects "OK" menu on the display screen shown in FIG. 7, the control block 11 displays a confirmation screen shown in FIG. 14. In the example shown in FIG. 14, the number of prints for each print size and the total amount of money to be charged are displayed. In addition, a password input window associated with user certification is displayed. When a sequence of operations associated with the confirmation screen has been completed, the control block 11 controls the fee-charging block 14 to execute a sequence of processing associated with the area. When the sequence of processing associated with the fee-charging has been completed without failure, then the control block 11 prints the images specified by the user. At this moment, the control block 11 prints the photographs by arranging the template on each image such that the image and the template correspond to those displayed on the image display block 4 set by the execution of the above-mentioned processing procedure. When the printing has been completed, the control block 11 returns into a standby state.

(2) Operation of the First Embodiment

In the above-mentioned configuration, with the image print apparatus 1 (refer to FIGS. 2 and 3), images based on the image data recorded to a recording media, such as a memory card, are printed by the print block 15 in response to the selection made by the user on the menus displayed on the image display block 4 and the prints are supplied to the user.

In the above-mentioned sequence of processing, if the user sequentially selects menus to select scrapbooking-associated menus (refer to FIGS. 4 and 5), a list of thumbnails of all printable images recorded to a recording media is displayed on the image print apparatus 1. On this list, the user selects images to be printed and print sizes, the selection being accepted by the control block 11 (refer to FIGS. 6 and 7).

At this moment, if the editing is specified by the user, a preview screen associated with the user-selected thumbnail images are displayed on the image print apparatus 1 and one of the templates stored in the template database 16A is superimposingly displayed on this preview screen. When operation menus displayed with the preview screen are operated by the user, the type, position, size, line thickness, and color of this template are changed (refer to FIGS. 1, 8 through 13). Then, the image corresponding to each thumbnail selected by the user is printed with the template arranged on the preview screen.

Consequently, the user can obtain prints of desired images in a form in which clip lines are drawn on each photograph with a ruler of a desired shape and size. Therefore, the user can then easily clip each photograph along the printed clip lines, thereby obtaining photographs shaped suitable for scrapbooking.

As described above, because each printed photograph is obtained by displaying a template on a photograph in a preview screen by changing the size and/or position of the template as desired on the photograph, the resultant printed photograph having the template printed thereon can be clipped along the template. This setup can easily and surely remove the mismatch that may occur between the size of a ruler and the size of a photograph to be clipped with the ruler when the user manually clip a photograph with a ruler. As a result, the novel configuration allows the user to easily create scrapbooks with desired designs, thereby enhancing the joy of scrapbooking.

With the manual clipping of photograph by use of a ruler, the user must draw lines on each photograph with a ruler having a desired shape and clip off the photograph along the drawn lines. However, unless this operation is executed very carefully, part of the drawn lines may be left on the clipped photograph, making the finish of the work poor.

In contrast, the present embodiment allows the setting of the color and line thickness of each template as desired as described above. Therefore, a template may be printed relatively thick to partially leave template borders to a certain width after clipping. The photograph can be clipped with a mat to be arranged between the clipped photograph and the mounting integrally printed and the borders colored substantially in the same color as that of the mat. Consequently, the template borders can be hidden, thereby further adding to the beauty of the finish of the clipped photograph. It should be noted that, if the borders of a template are set relatively thick to partially leave after clipping, the use of a mat on which a photograph is attached can be eliminated. This shortens the time necessary for creating a scrapbook, while allowing the user enjoy the manual work.

Also, one of the above-mentioned color settings may be set so as to emphasize each pixel value of a preview image overlapping a template. In this case, if the borders of the template are drawn relatively thin, the portion of these thin borders remaining on the photograph after clipping can be made inconspicuous, thereby further adding to the beauty of the finish of scrapbooking.

In addition, clipping photographs with reference to templates allows the use of leftover pieces of photograph print also as materials for scrapbooking.

The image print apparatus 1 associated with the first embodiment of the invention can read the image of each template associated with the above-mentioned processing through the flat-bed scanner 5 and register the template, thereby easily supplying templates as required for enhanced user-friendliness.

On the other hand, if the user changes the position, color, and thickness of a template and operates the cancel menu, these settings are cleared, upon which the original list of thumbnail images is displayed.

In this case, the user can select an image to be printed and the print size thereof, while arranging a template on the preview screen and checking a state in which the image is clipped off by the template. Consequently, the user can remove the mismatch between the size of ruler and the size of photograph by changing print sizes or specifying another photograph of the same type. In this case, the embodiment can also be applied to scrapbooking to easily and surely remove the mismatch between the size of ruler and the size of photograph that may occur in the case of manual scrapbooking.

(3) Effects of the First Embodiment

As described and according to the first embodiment of the invention, a template selected by the user is superimposingly displayed on an image subject to processing, the relative positional relationship between the template and image is adjusted as desired, and the size of the template is altered as required, and the resultant template and image are printed together for scrapbooking. The novel configuration can easily and surely remove the mismatch between the size of ruler and the size of photograph that may occur in the case of manual scrapbooking.

Printing photographs each with a template superimposed allows the user to clip photographs into desired shapes without manually drawing cutoff lines on photographs with rulers, thereby significantly enhancing the efficiency of scrapbooking. In addition, the novel configuration allows the clipping of photographs in various sizes without using various rulers, thereby significantly enhancing the efficiency of scrapbooking.

Further, adjusting the color and/or thickness of template borders can make inconspicuous the remnants of borders on a clipped photograph or use clip wastes as embellishments, thereby enhancing the beauty of the finish of scrapbooking.

Second Embodiment

An image print apparatus practiced as a second embodiment of the invention prints photographs by changing the size of each photograph, instead of changing the size of templates as in the above-mentioned first embodiment. It should be noted that the image print apparatus of the second embodiment is generally the same in configuration as the above-mentioned image print apparatus 1 of the first embodiment except for the configuration of a control block that controls the alteration of the size of image. In what follows, the second embodiment will be described by use of the configuration of the above-mentioned image print apparatus 1 described with reference to FIGS. 2, 3, and so on.

Figure 15:
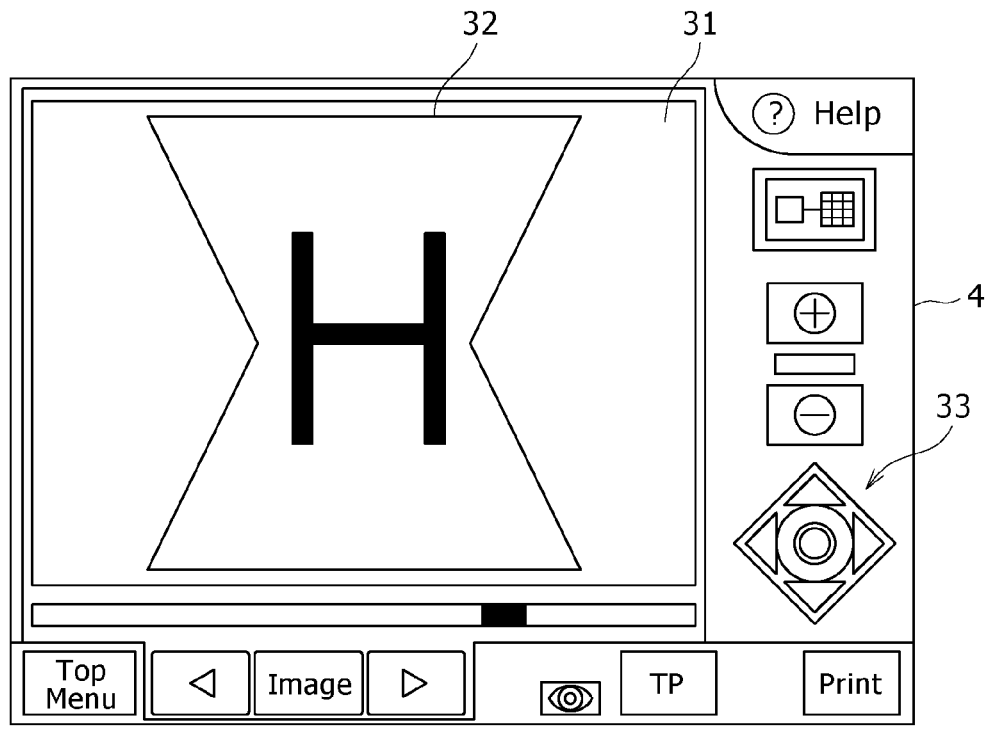
FIG. 15 is a top view of a display screen in an image print apparatus practiced as a second embodiment of the invention.

Now, referring to FIG. 15, there is shown a top view of a preview screen to be displayed on the image print apparatus according to the second embodiment. If an edit menu is selected after the selection of a thumbnail image in the list of thumbnail images, a control block 11 of the image print apparatus of the second embodiment displays this preview screen. On this screen, an preview image 31 is displayed and a template 32 is displayed on this preview image 31. At the bottom of the preview screen, "Top Menu" for returning to a top menu screen, a menu for switching between images to be displayed by the preview image 31, "Template" for displaying a list of templates, and "Print" for printing images are shown.

When "Template" menu for displaying a list of templates is selected by the user, the control block 11 switches the current display on a image display block 4 to the display of this template list recorded to a template database 16A, thereby detecting the selection of template in this list. When this selection is made, the control block 11 stops displaying the template list, switching the display of the template 32 on the preview image 31 to the display of the template selected by user from the template list.

Figure 16:
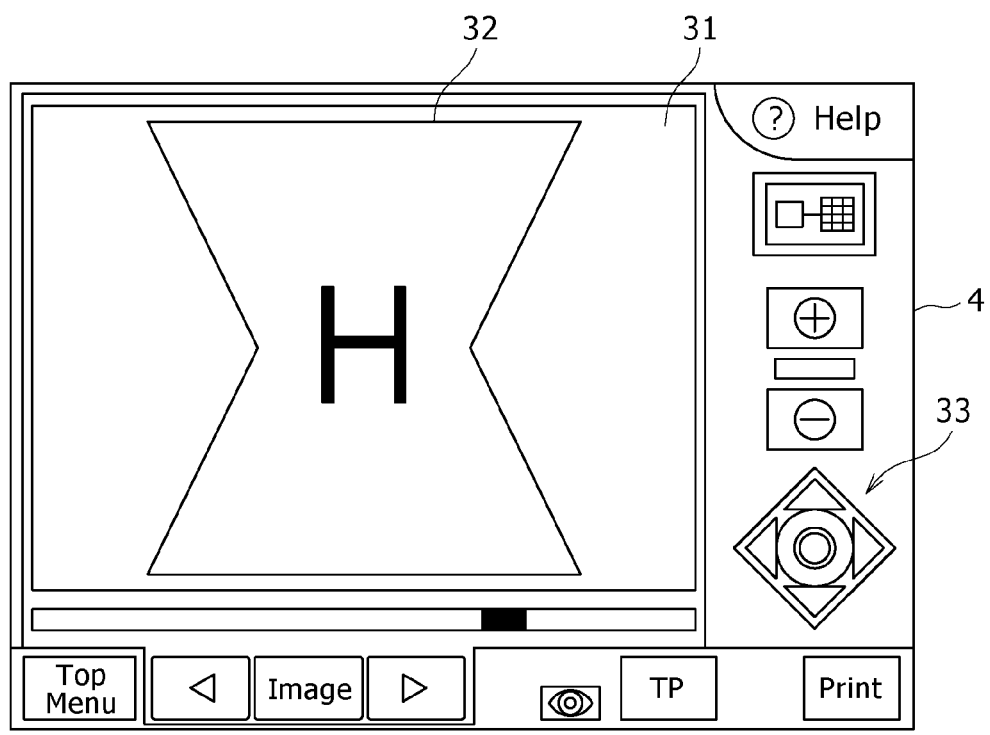
FIG. 16 is a top view for describing image size reduction on the display screen shown in FIG. 14.
Figure 17:
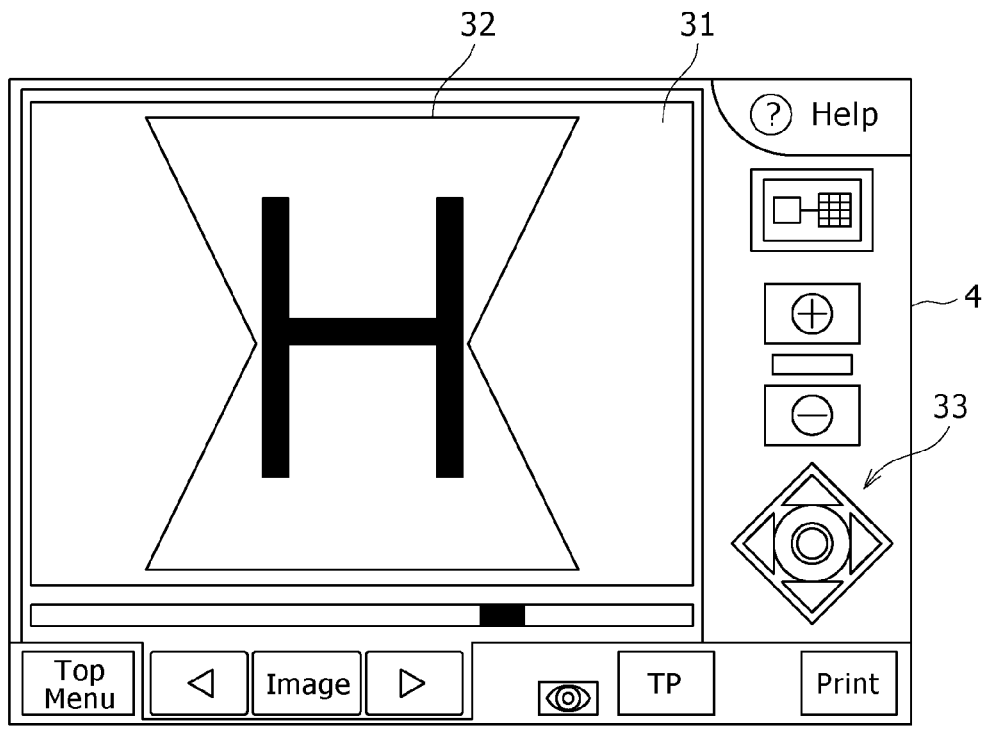
FIG. 17 is a top view for describing image size enlargement on the display screen shown in FIG. 14.

On the right side of this display screen, "Help" menu for displaying a help screen, "+" and "−" menus for increasing and decreasing the number of prints, and a menu 33 for changing the position of the preview image 31 relative to the template 32 are shown. The menu 33 has a circular menu at the center for decreasing the size of the preview image 31 and a ring menu, around this circular menu, for increasing the size of the preview image 31. In response to the operation of these size enlargement and reduction menus, the control block 11 enlarge or reduce the size of the preview image 31 as shown in FIGS. 16 and 17 in contrast with FIG. 15.

Figure 18:
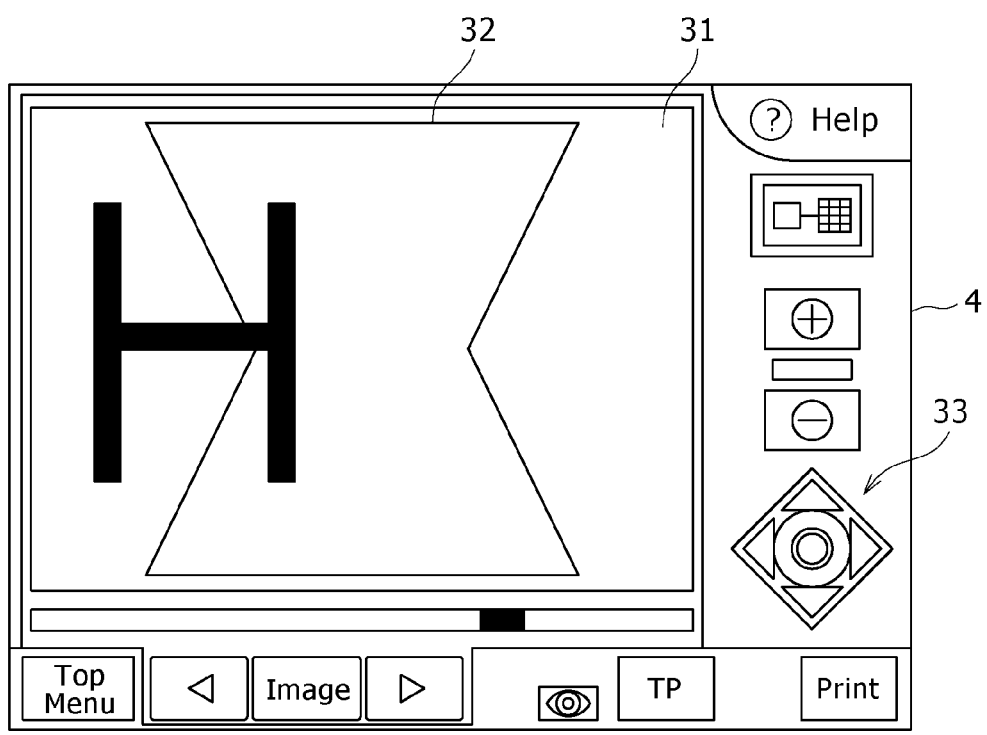
FIG. 18 is a top view for describing image movement on the display screen shown in FIG. 14.

The menu 33 also has triangular menus, around the ring menu, in the up, down, left, and right directions for changing the position of the preview image 31 in these directions. As shown in FIG. 18 with reference to FIG. 17, the control block 11 moves the display position of the preview image 31 as specified by the user through these menus.

When a print operation is specified, a menu screen for inquiring the user whether to print the template superimposed on the image. If the user does not specify the superimposition of the template, then the image is printed in the enlarged or reduced or position-changed state. Consequently, with the second embodiment, the mismatch between the size of ruler and the size of photograph can easily and surely be eliminated when the user draws clip lines with a ruler to clip a photograph into a desired shape. It should be noted that templates having sizes and shapes based on commercially available rulers are stored in the template database 16A.

On the other hand, if the user specifies the printing of the template superimposed on the image, the user also specifies the color and/or border thickness of the template. Then the preview image 31 is printed as specified by the user as described above in the description of the first embodiment. In this case, the user can also clip the image by making the template borders on the clipped image inconspicuous as with the case in which clip lines are drawn with a commercially available ruler to clip the image into a desired shape. In this case, various parts, such as a mat provided when images are clipped with rulers, may be used to create a scrapbook.

According to the second embodiment of the invention, the position and size of an image can be changed relative to a template, instead of changing the position and size of a template relative of an image, thereby providing substantially the same effects as provided by the first embodiment of the invention.

Third Embodiment

Figure 19:
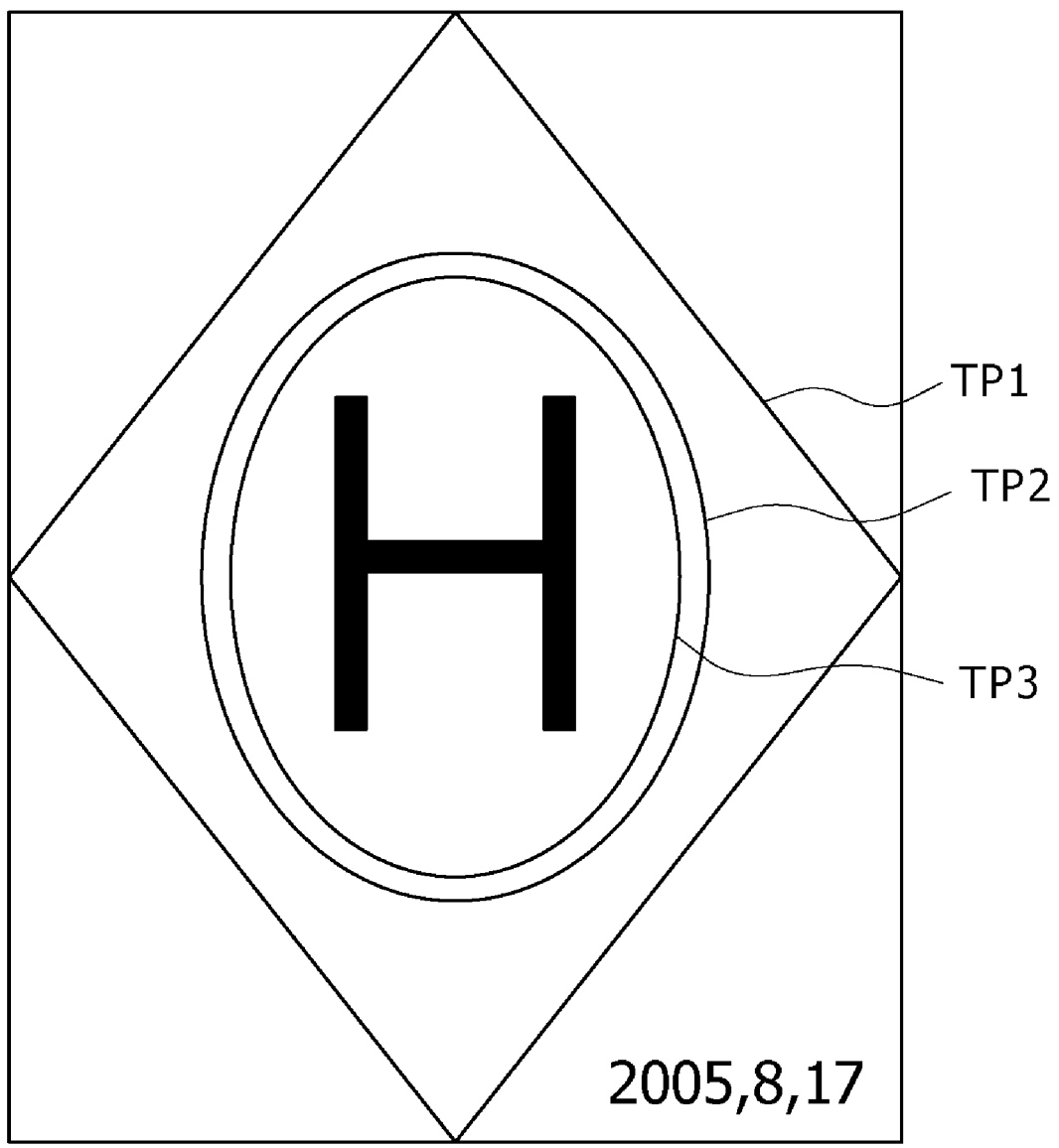
FIG. 19 is a top view of a display screen in an image print apparatus practiced as a third embodiment of the invention.

Now, referring to FIG. 19, there is shown a top view indicative of a template setting display screen in an image print apparatus practiced as a third embodiment of the invention. The image print apparatus of the third embodiment displays templates TP1 through TP3 superimposingly on a preview screen by the number specified by the user. The positions and sizes of these templates TP1 through TP3 are inputted by the user into the image print apparatus. Instead of the border thickness and color of these templates TP1 through TP3, the color of an area between the template arranged inside and the template arranged outside is inputted by the user into the image print apparatus. Consequently, in the example shown in FIG. 19, the color of the area between template TP1 and template TP2 and the color of the area between template TP2 and template TP3 are inputted by the user into the image print apparatus. The colors of templates corresponding to the colors thus set are altered.

In accordance with the above-mentioned settings, the image print apparatus of the third embodiment prints an image with these templates TP superimposingly displayed on the preview image. Information about this photograph is printed at a position of the clipping with the outermost template TP1. In this embodiment, this information includes a date on which this printing is made. The image print apparatus of the third embodiment is generally the same in configuration as the image print apparatus of the first or second embodiment except for this template-associated processing.

In the third embodiment, a plurality of templates are displayed in an overlapping manner, so that an image can be clipped with more embellishments and a mat to be arranged under the clipped image can be omitted, thereby enhancing the user-friendliness of the image print apparatus.

Information associated with the photograph is printed at the position of clipping, thereby providing convenience in managing photographs in scrapbooking.

Fourth Embodiment

Figure 20:
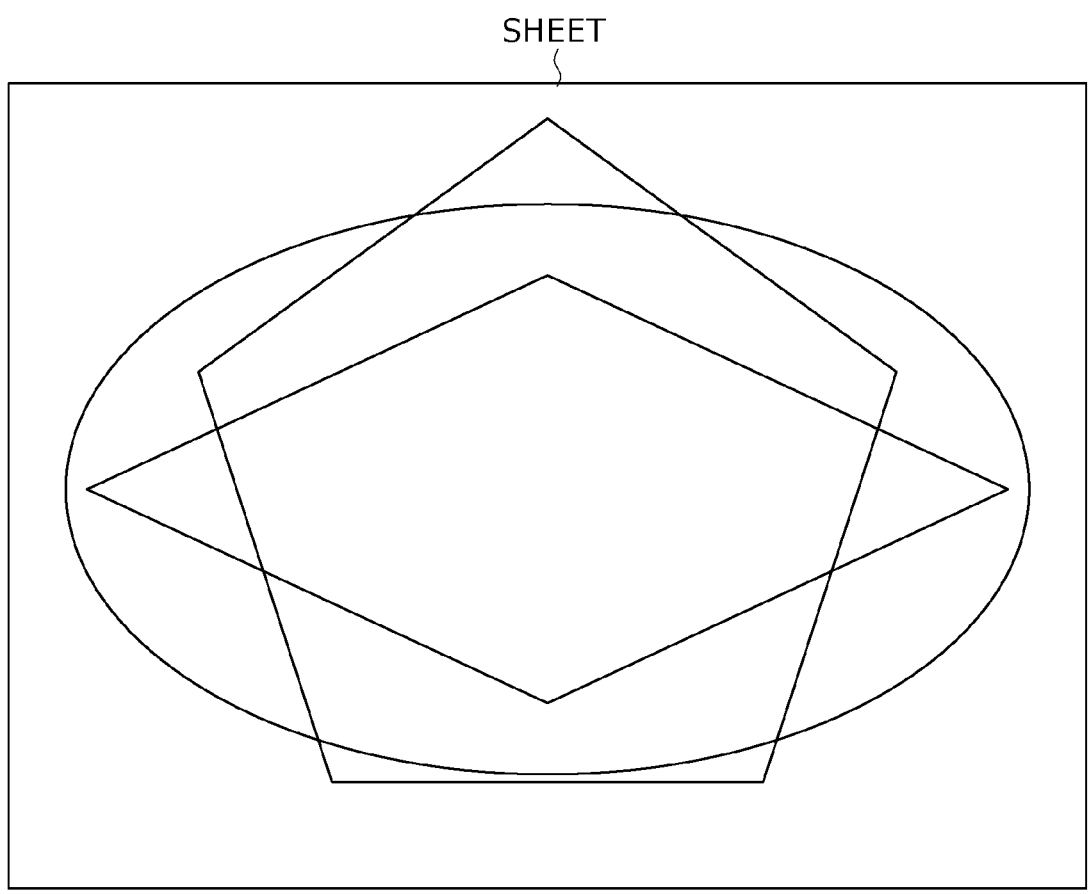
FIG. 20 is a top view of the rear side of a sheet of paper applicable to an image print apparatus practiced as a fourth embodiment of the invention.

The image print apparatus practiced as a fourth embodiment of the invention prints an image on a print paper printed with cutoff lines on the rear side. Referring to FIG. 20, there is shown a top view of the rear side of a print paper for the printing by this embodiment. This print paper is printed with a plurality of template-associated cutoff lines beforehand to be provided for the image print apparatus of the fourth embodiment.

The image print apparatus of the fourth embodiment holds a plurality of types of print papers printed with cutoff lines on the rear side. When the user selects any of the template types, the image print apparatus prints a photograph on the print paper printed with a cutoff line selected by the user.

As with the image print apparatus of the second embodiment, the image print apparatus of the fourth embodiment may also display, on a preview image, a template corresponding to a cutoff line printed on the rear side of print paper and accept the settings of the change in the position and/or the size of the preview image relative to the template, thereby printing each photograph on the print paper printed with a corresponding cutoff line such that the relative positional and size relationships between the template in the display of the preview image and the preview image become the relative positional and size relationships between the corresponding cutoff line printed on the rear side of print paper and the image printed on the front side of print paper. In this case, the image print apparatus of the fourth embodiment is set so as not print the templates.

Consequently, in the fourth embodiment, in printing an image on a print paper printed with cutoff lines on the rear side, the mismatch between each cutoff line corresponding to a ruler and the size of a photograph to be printed on the front side can also be removed easily and surely.

Fifth Embodiment

Figure 21:
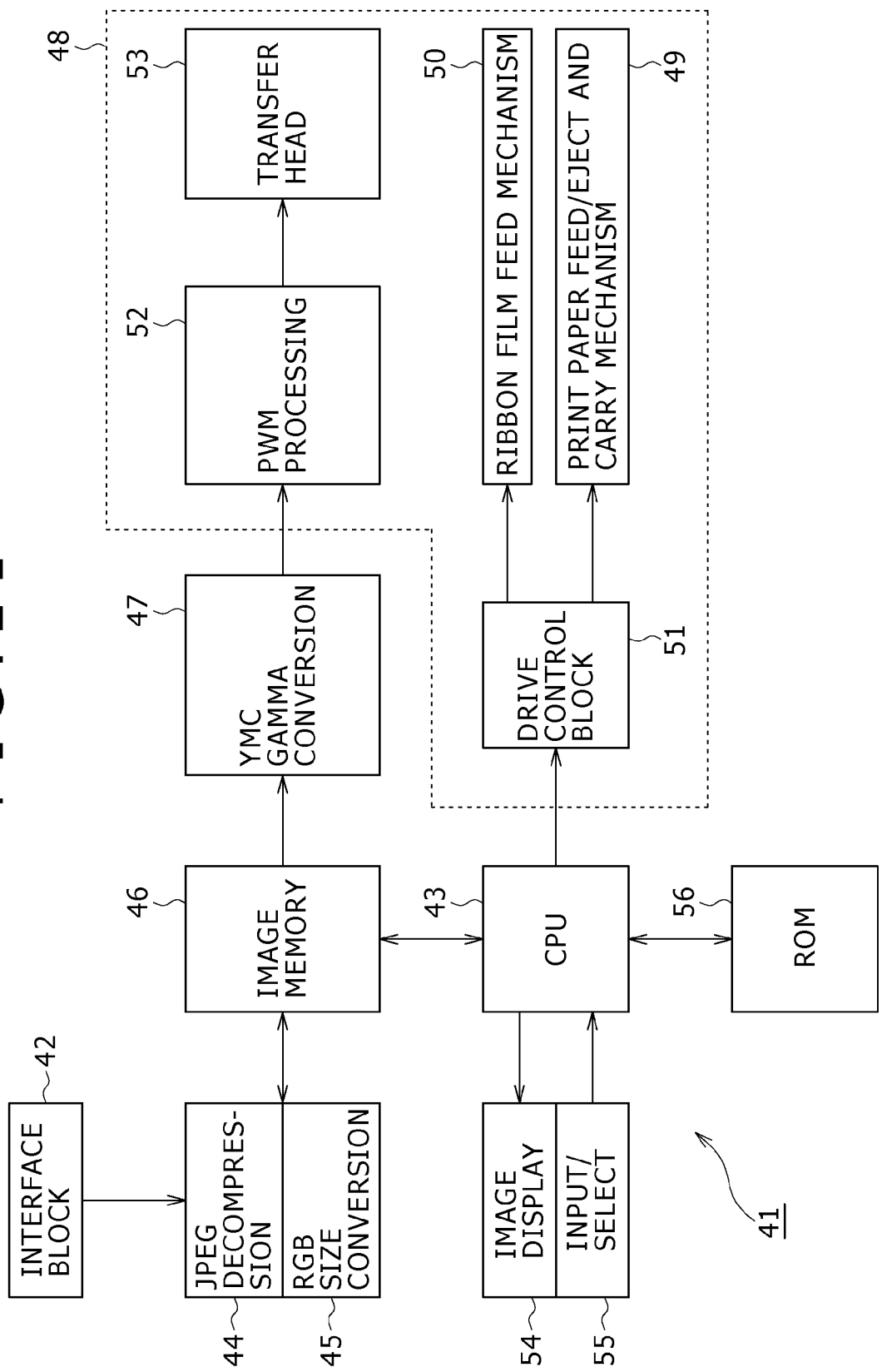
FIG. 21 is a block diagram illustrating an exemplary configuration of an image print apparatus practiced as a fifth embodiment of the invention.

Referring to FIG. 21, there is shown a block diagram illustrating an exemplary configuration of an image print apparatus practiced as a fifth embodiment of the invention. An image print apparatus 41 print an image on a print paper and covers the printed side of the print paper with a transparent film, thereby forming a transparent protective layer on the printed side. The image print apparatus 41 applies heat to this transparent film to locally alter the luster of the transparent film and visually prints a template on the protective layer by use of the difference in luster between the heat-applied portion and other portions on the protective layer.

Namely, printing a template on the printed side of a print paper allows the user to clip the photograph along the printed template for convenience. However, if the template is printed by simply applying a print ink, the clipped photograph may retain part of the printed template, thereby diminishing the beauty of the finish of scrapbooking.

The above-mentioned trouble can be solved by the fifth embodiment, in which a template is printed on the protective layer visually by the difference in luster from other portions. This setup makes inconspicuous the part of the template remaining on a clipped photograph, thereby adding to the beauty of the finish of scrapbooking.

Actually, the transparent film for forming a protective layer of this kind is available in a so-called laminate film. The surface luster of the laminate film can easily be altered by applying heat in covering a print paper. The resultant altered surface luster, when looked at from the front, is very hard to notice, but conspicuous when looked at askew. Consequently, in the fifth embodiment, a template is printed such that the printed template is conspicuous when clipping a photograph and inconspicuous after clipping if there remained parts of the template on the clipped photograph.

A configuration in which a protective layer is formed with the laminate film as mentioned above is substantially similar to that for related-art thermal transfer printers. Therefore, by switching drive conditions for driving the head for covering the laminate film of the present configuration in accordance with template shapes, the luster can be formed in template shapes, thereby adding to the beauty of the finish of photographs clipped by the simple configuration.

It should be noted that the image print apparatus 41 of the fifth embodiment accepts the settings of template selection and image and template sizes through substantially the same user interface as that of each of the above-mentioned embodiments except for the above-mentioned template printing.

Namely, in the image print apparatus 41, an interface block 42 has a configuration corresponding to that of the media I/F 13 of the image print apparatus 1, capturing image data and so on from each recording media loaded on the loading slot to output the captured image data and so on under the control of a CPU 43.

A JPEG (Joint Photographic Experts Group) decompression block 44 decompresses the data-compressed image data inputted from the interface block 42, converts the decompressed image data into RGB color data, and outputs the converted image data to an RGB size conversion block 45 under the control of the CPU 43. If the image data inputted from the interface block 42 is not data-compressed, the JPEG decompression block 44 outputs the received image data to the RGB size conversion block 45 without processing the image data.

The RGB size conversion block 45 converts the resolution of the image data supplied from the JPEG decompression block 44 and then corrects the color tone of the image data, outputting the resultant image data under the control of the CPU 43.

An image memory 46 temporarily stores the image data outputted from the RGB size conversion block 45 and the image data of a template outputted from the CPU 43 and outputs these pieces of image data to a YMC-gamma conversion block 47 under the control of the CPU 43.

The YMC-gamma conversion block 47 converts the image data outputted from the image memory 46 into color data of a complementary color system suitable for printing and executes gamma correction, outputting the resultant image data. It should be noted that the YMC-gamma conversion block 47 passes the image data of a template outputted from the image memory 46 to a print block 48 without executing any processing.

The print block 48, having a configuration corresponding to that of the print block 15 of the image print apparatus 1, prints the image data outputted from the YMC-gamma conversion block 47 to a predetermined print paper in a thermal transfer manner and then covers the printed surface with a laminate film. In addition, the temperature of the heat to be applied to the laminate film is varies in accordance with the image data of a template outputted from the YMC-gamma conversion block 47, thereby locally altering the luster of the laminate film to print the template.

To be more specific, in the print block 48, a print paper feed/eject and carry mechanism 49 carries a print paper that is a paper to be printed and ejects the print paper. A ribbon film feed mechanism 50 carries a ribbon laminate film for thermal transfer printing in match with the carry of print paper by the print paper feed/eject and carry mechanism 49. A drive control block 51 controls the print paper by the print paper feed/eject and carry mechanism 49 and the ribbon film feed mechanism 50 under the control of the CPU 43.

A PWM processing circuit 52 generates the outputs a pulse width modulation signal in accordance with the image data outputted from the YMC-gamma conversion block 47. A transfer head 53 heats the ribbon for thermal transfer printing carried by the ribbon film feed mechanism 50, printing the image on the print paper. When the laminate film is laminated on the print side of this print paper by the ribbon film feed mechanism, the laminate film is heated to cover the print side with the laminate film. At this moment, the heating temperature varies in accordance with the image data of the template to locally alter the luster of the laminate film, printing the template on the laminate film.

Figure 22:
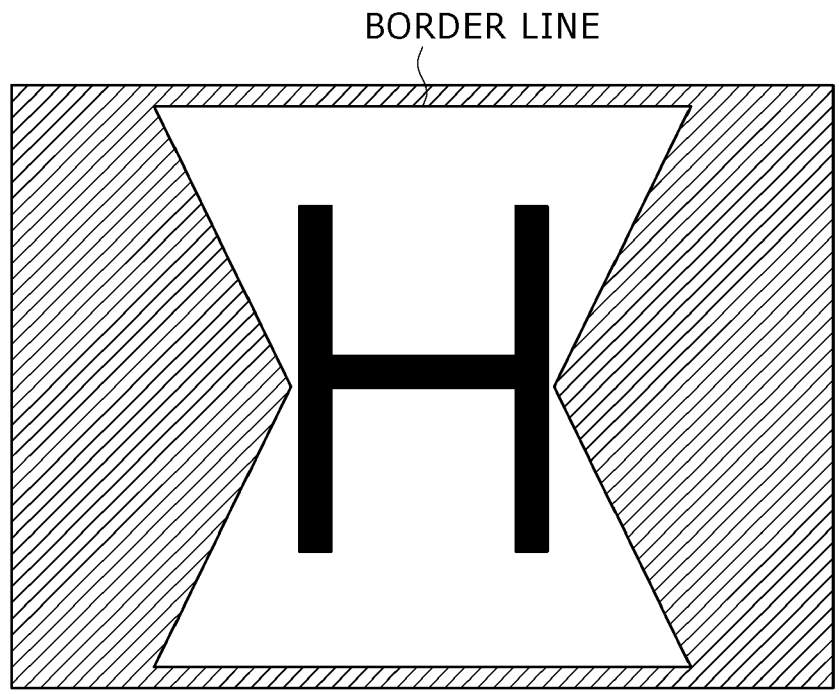
FIG. 22 is a top view for describing a photograph printed by the image print apparatus shown in FIG. 21.
Figure 23:
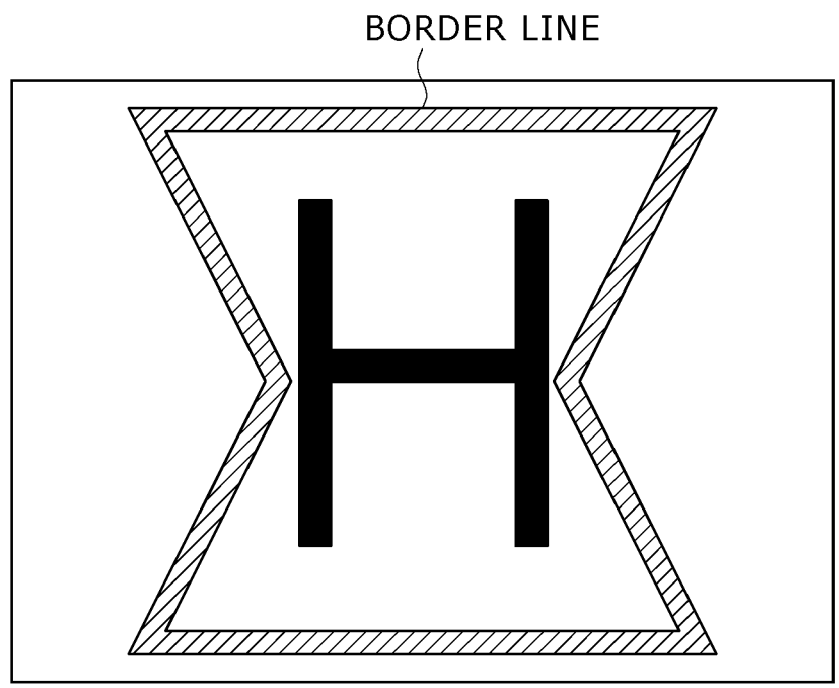
FIG. 23 is a top view of an example different from that shown in FIG. 22.

In the fifth embodiment, a template is printed such that the luster is locally lost in the shape of a border line indicative of the shape of the template. Conversely, it is also practicable to print a template such that the luster appears in the shape of a border line. In addition, as shown in FIG. 22, the luster may be lost in all of the external rim area to be clipped with the template or, as shown in FIG. 23, the luster may be lost in the area of a certain width of the external rim side along the border line. In each of FIGS. 22 and 23, the area in which the luster is lost is indicated by hatching.

An image display block 54, having a configuration corresponding to that of the image display block 4 of the image print apparatus 1, displays various graphical user's interfaces described before with reference to the image print apparatus 1.

An input/select block 55, having a configuration corresponding to that of the touch panel 12 of the image print apparatus 1, detects various user operations and sends the detection to the CPU 43.

A ROM (Read Only Memory) 56, having a configuration corresponding to that of the HDD 16 of the image print apparatus 1, stores processing programs for the CPU 43 and a template database.

The CPU 43 constitutes a control block together with the ROM 56 and a RAM (Random Access Memory) not shown. It should be noted that this control block has a configuration corresponding to that of the control block 11 of the image print apparatus 1. Consequently, the CPU 43 executes the processing procedure shown in FIG. 1 to display the various menu screens and so on described before with reference to FIGS. 4 through 18 on the image display block 54 and accepts various settings entered by the user. In accordance with the accepted settings, the CPU 43 controls the RGB size conversion block and so on to store the image data of print size into the image memory 46, printing this image data through the print block 48.

According to the fifth embodiment, after an image is printed, the printed side is converted with a transparent laminate film, and the luster of this transparent laminate film is locally altered to print a template on the transparent laminate film, thereby adding to beauty of the finish of each photograph clipped along the template.

Sixth Embodiment

In the above-mentioned fourth embodiment, print papers printed with cutoff lines on the rear side are held in the image print apparatus and photographs are printed on these print papers. Alternatively, these print papers may be supplied otherwise to print photographs thereon. In this case, the image of cutoff line printed on the rear side of print paper may be captured with a scanner to use the capture image as a template, thereby executing the above-mentioned sequence of processing operations to easily and surely eliminate the mismatch between the cutoff line on the rear side corresponding to a ruler and the size of photograph.

In the above-mentioned fifth embodiment, a template is printed on the outer surface of a transparent film. Alternatively, the present invention may be widely applied to an example in which a plurality of templates are printed to embellish photographs as described with reference to FIG. 19, for example. In this case, the outermost template indicative of a cutoff line is printed on the outer surface of a transparent film, printing other templates on a print paper with an image based on image data.

In the above-mentioned embodiments, a sequence of processing operations are executed by use of templates registered beforehand. The present invention is not limited to this configuration. For example, templates may be entered by the user. In this case, user-supplied templates may be drawn on the touch panel to be captured in the image print apparatus, for example.

In the above-mentioned embodiments, user-selected images are printed one by one. The present invention is not limited to this configuration. For example, two or more user-selected images may be continuously printed on one sheet of print paper by so-called multi-print processing.

In the above-mentioned embodiments, one of the image and the template is enlarged or reduced. The present invention is not limited to this configuration. For example, both of the image and the template may be enlarged or reduced.

In the above-mentioned embodiments, the image print apparatuses are installed in shop front to print user-supplied images. The present invention is not limited to this configuration. For example, the present invention is also applicable to the printing of images supplied over networks and the printing of images supplied from an imaging device, such as an electronic still camera, directly connected to the image print apparatus via an interface, such as USB (Universal Serial Bus), for example.

In the above-mentioned embodiments, the present invention is applied to dedicated photograph printing apparatuses. The present invention is not limited to this configuration. For example, the present invention is applicable widely to various photograph printing apparatuses, such as apparatuses based on programs for making a computer print and edit images and printer applications connected to a computer, for example.

As described and according the invention, the above-mentioned embodied image print apparatuses are applicable to the printing of images for use in scrapbooking.

While preferred embodiments of the present invention have been described using specific terms, such description is for illustrative purpose only, and it is to be understood that changes and variations may be made without departing from the spirit or scope of the following claims.

What is claimed is:

1. An image print apparatus configured to print an image for use in scrapbooking, comprising:
    an image data acquisition block configured to acquire image data of an image subject to processing;
    a template hold block configured to hold a plurality of templates each indicative of a clipping shape of said image for scrapbooking with a border line of said clipping shape;
    a template select block configured to select at least one of said plurality of templates held in said template hold block;
    an image display block configured to display the template selected by said select block by arranging said selected template on said image based on said image data acquired by said image data acquisition block;
    an operator block configured to operate a user-specified change in a relative position between said image and said template displayed on said image display block and in a size of at least one of said image and said template displayed on said image display block; and
    a print block configured to print said image displayed on said image display block and manipulated on said operator block.

2. The image print apparatus according to claim 1, wherein said print block prints said template over said image.

3. The image print apparatus according to claim 2, wherein said operator block is operated to enter a change in color and line width of said template.

4. The image print apparatus according to claim 1, further comprising:
    a template registration block configured to register said plurality of template into said template hold block.

5. The image print apparatus according to claim 2, wherein said print block, after printing said image, covers the printed image with a transparent film and prints said template over said transparent film after locally altering luster of said transparent film.

6. An image print method for printing an image for use in scrapbooking, comprising the steps of:
    acquiring image data of an image subject to processing;
    selecting at least one of said plurality of templates held in said template hold block;
    wherein said template hold block configured to hold a plurality of templates each indicative of a clipping shape of said image for scrapbooking with a border line of said clipping shape;
    displaying the template selected by said select block by arranging said selected template on said image based on said image data acquired by said image data acquisition step;
    operating a user-specified change in a relative position between said image and said template displayed in said image display step and in a size of said image and said template displayed in said image display step; and
    printing said image displayed in said image display step and manipulated in said user-specified change operating step.

7. A computer-readable program configured to execute an image print method for printing an image for use in scrapbooking by a computational procedure, comprising the steps of:
    acquiring image data of an image subject to processing;
    selecting at least one of said plurality of templates held in said template hold block;
    wherein said template hold block holding a plurality of templates each indicative of a clipping shape of said image for scrapbooking with a border line of said clipping shape;
    displaying the template selected by said select block by arranging said selected template on said image based on said image data acquired by said image data acquisition step;
    operating a user-specified change in a relative position between said image and said template displayed in said image display step and in a size of said image and said template displayed in said image display step; and
    printing said image displayed in said image display step and manipulated in said user-specified change operating step.

8. A computer readable storage medium on which is stored a computer-executable program configured to execute an image print method configured to print an image for use in scrapbooking by a computational procedure, comprising the steps of:
    acquiring image data of an image subject to processing;
    selecting at least one of said plurality of templates held in said template hold block;
    wherein said template hold block holding a plurality of templates each indicative of a clipping shape of said image for scrapbooking with a border line of said clipping shape;
    displaying the template selected by said select block by arranging said selected template on said image based on said image data acquired by said image data acquisition step;
    operating a user-specified change in a relative position between said image and said template displayed in said image display step and in a size of said image and said template displayed in said image display step; and
    printing said image displayed in said image display step and manipulated in said user-specified change operating step.

* * * * *